Oct. 24, 1967     W. B. EASTON     3,348,493
FLUID PRESSURE REMOTE CONTROL DEVICES AND SYSTEMS
Filed Oct. 21, 1965     11 Sheets-Sheet 1
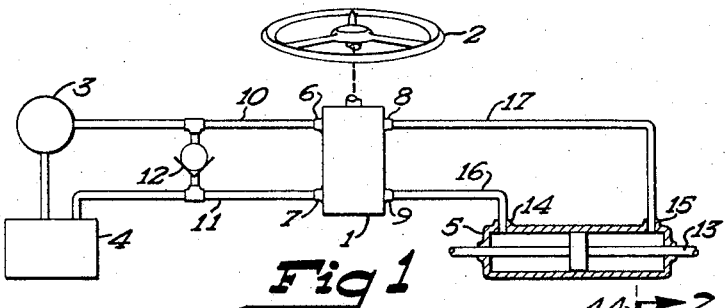
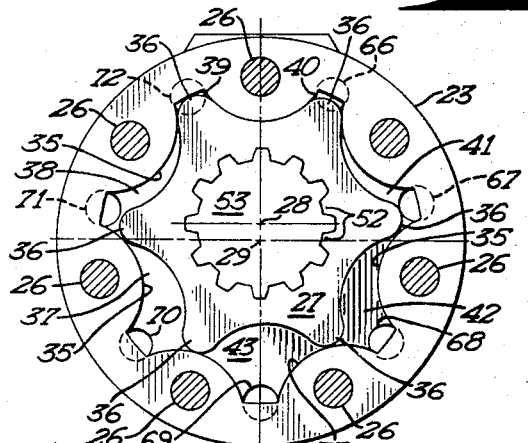
Fig 5
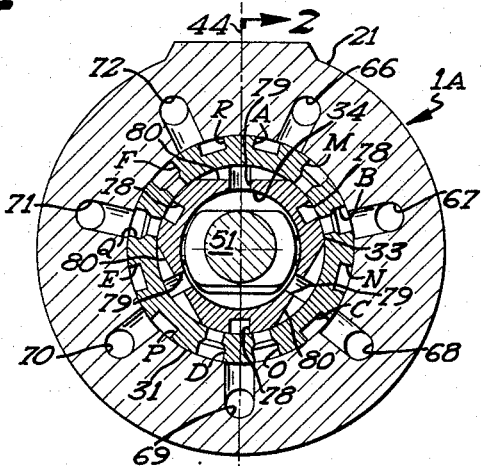
Fig 6
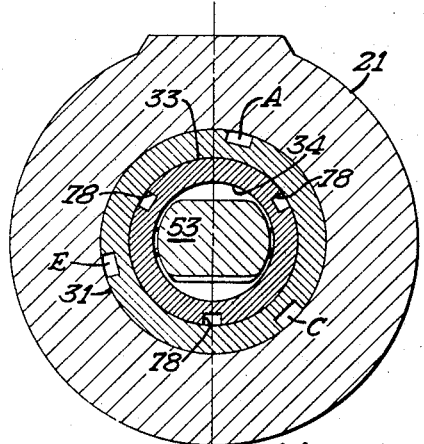
Fig 7
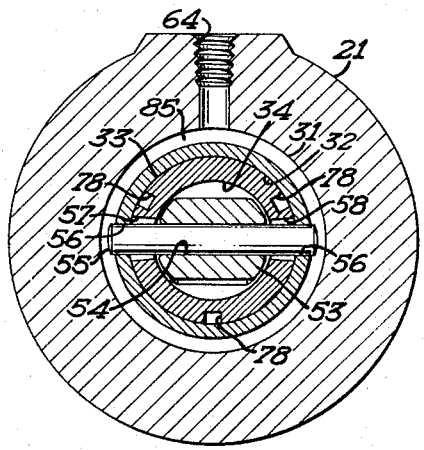
Fig 8
INVENTOR.
WAYNE B. EASTON

INVENTOR.
WAYNE B. EASTON

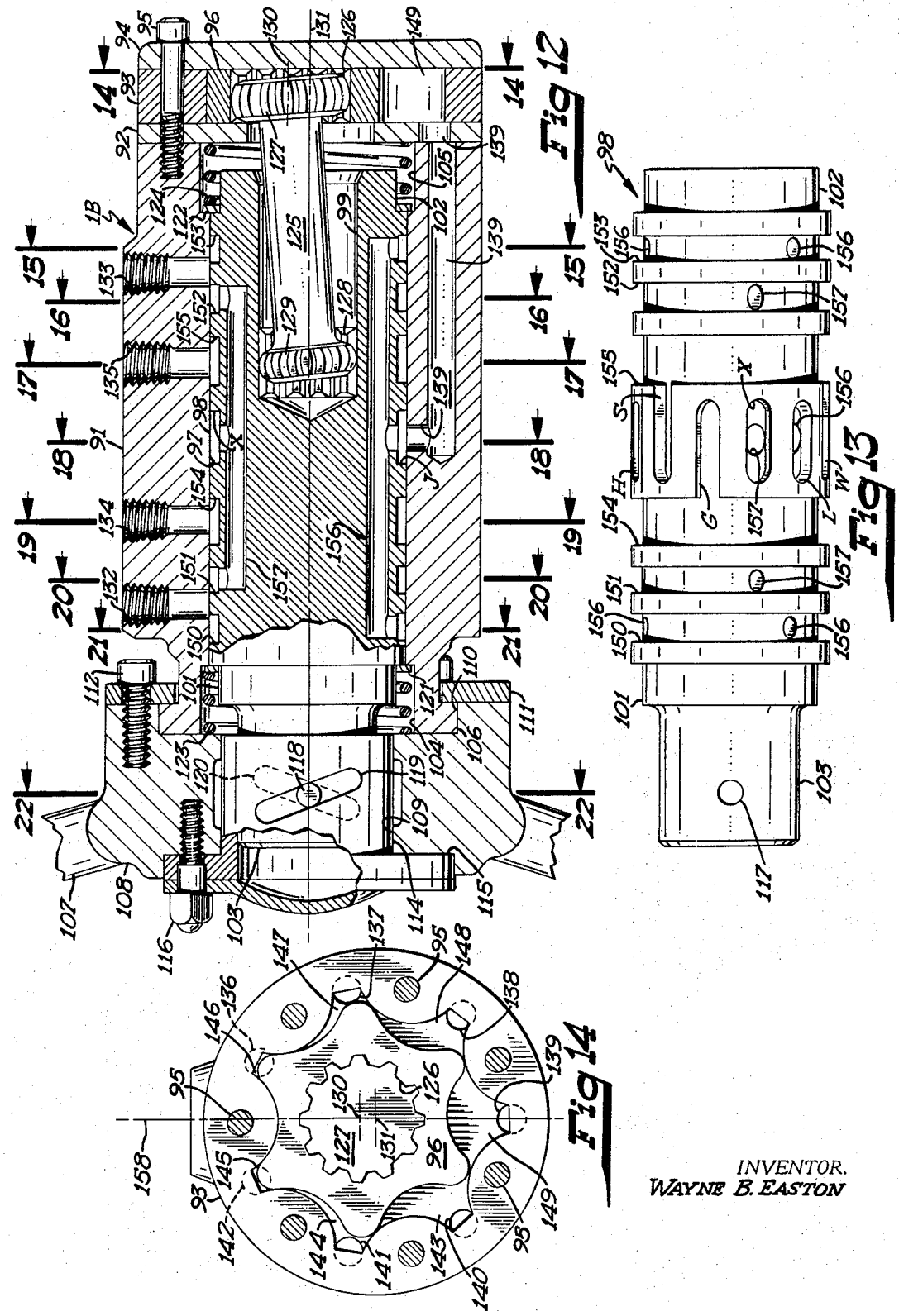

INVENTOR.
WAYNE B. EASTON

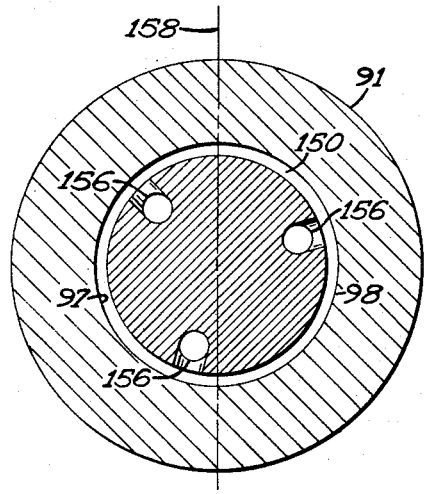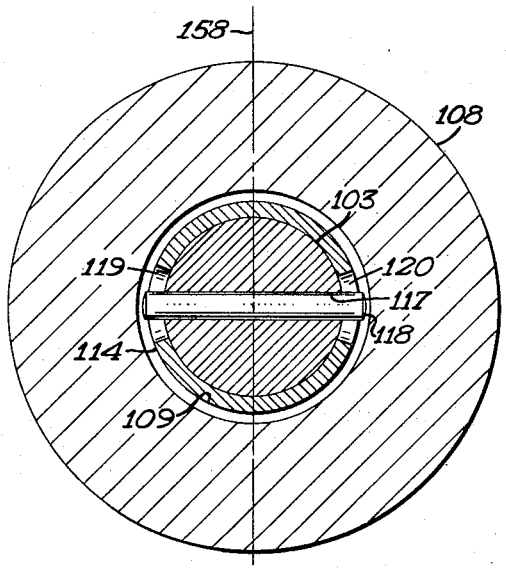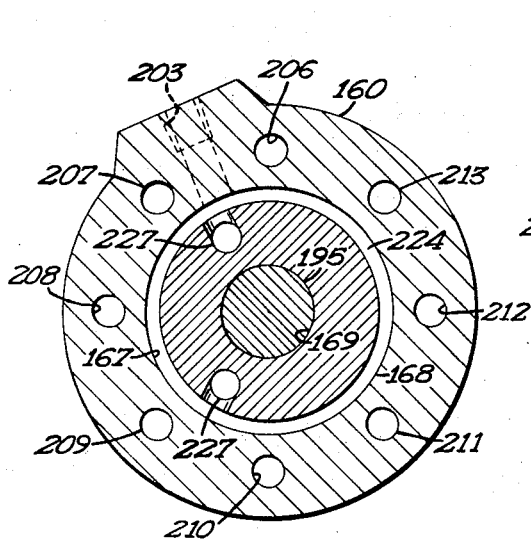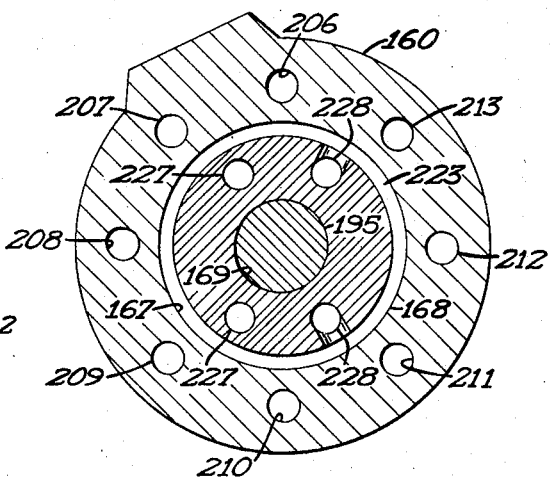
INVENTOR.
WAYNE B. EASTON

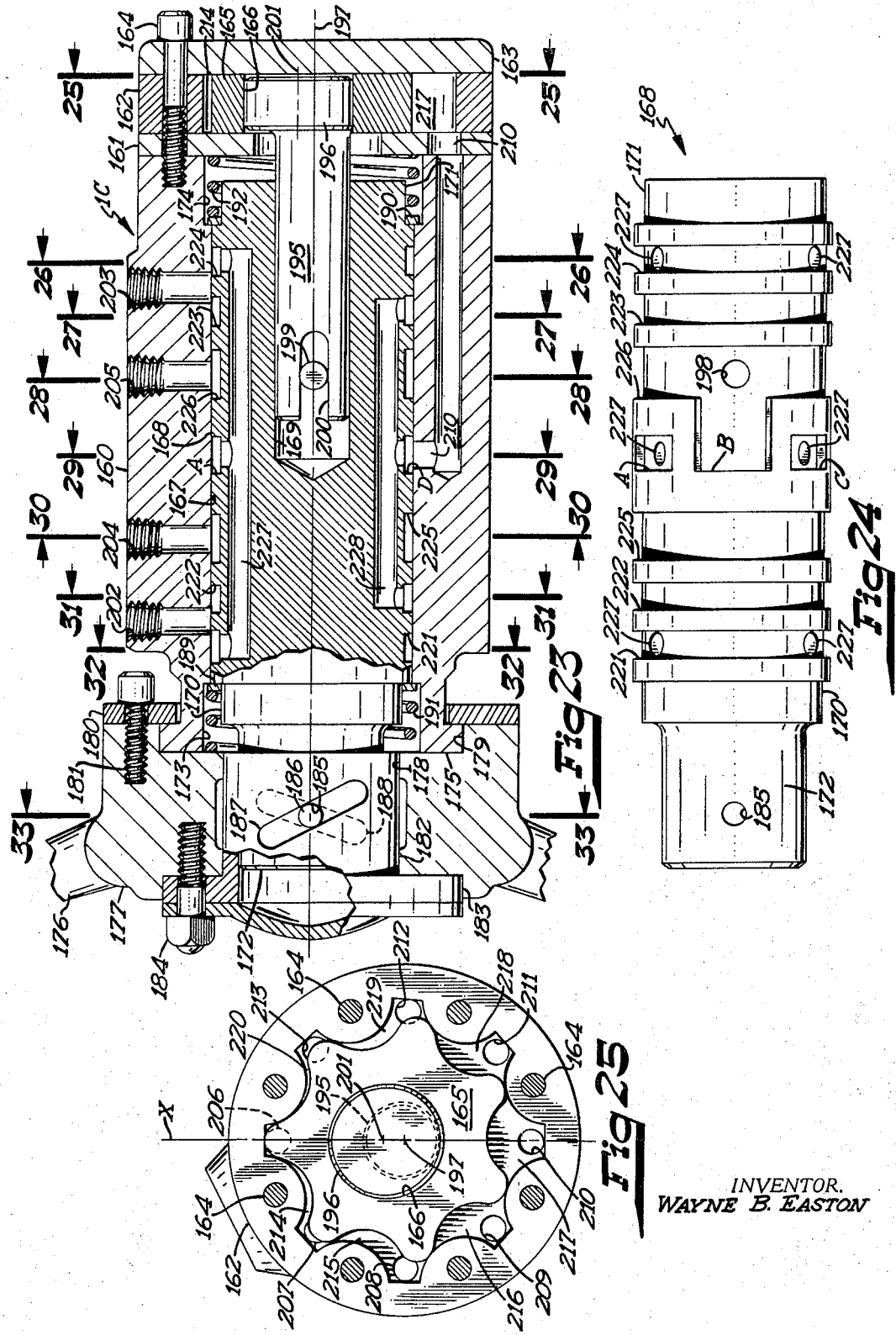

INVENTOR.
WAYNE B. EASTON

Oct. 24, 1967  W. B. EASTON  3,348,493
FLUID PRESSURE REMOTE CONTROL DEVICES AND SYSTEMS
Filed Oct. 21, 1965  11 Sheets-Sheet 9

INVENTOR.
WAYNE B. EASTON

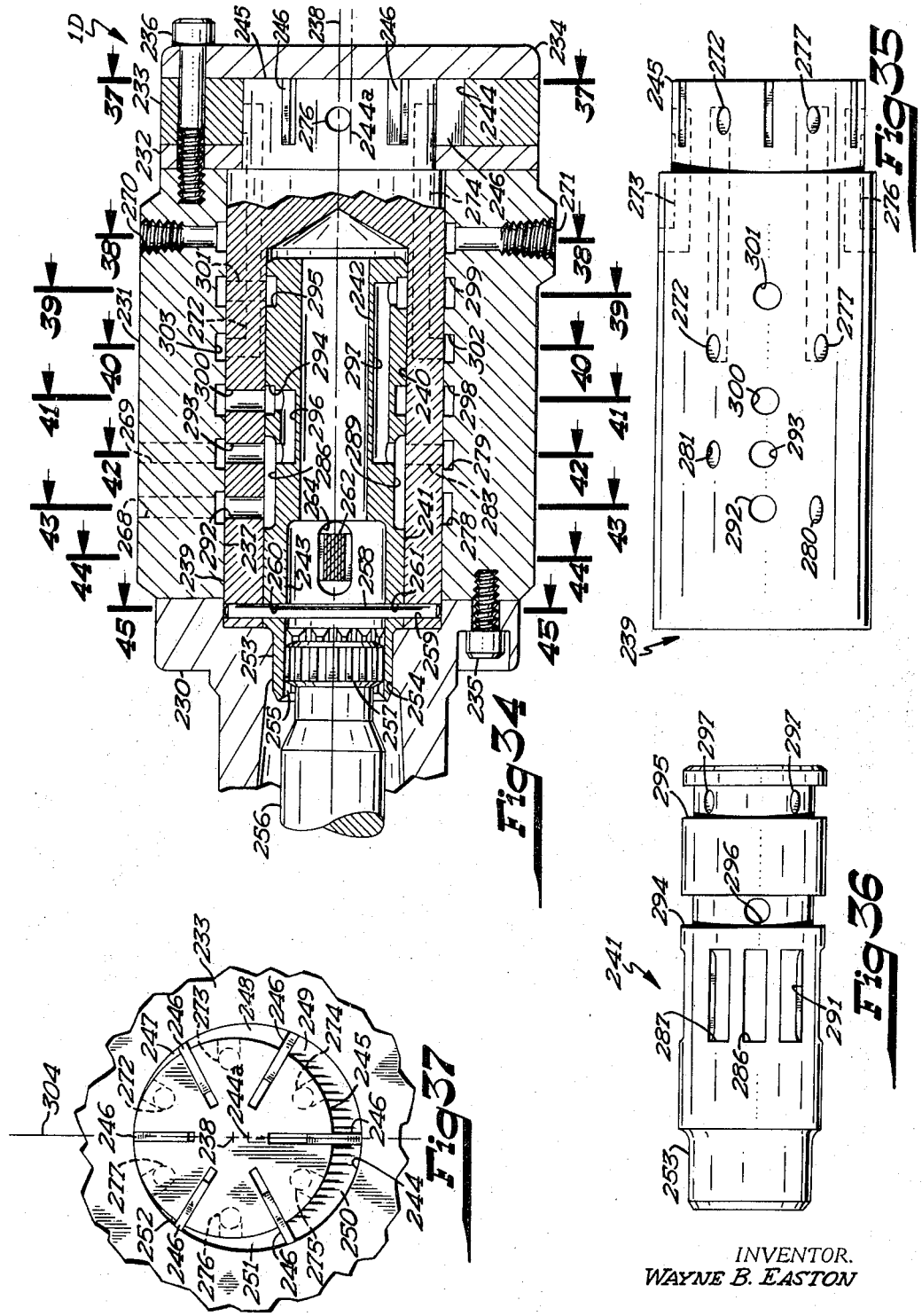

Oct. 24, 1967  W. B. EASTON  3,348,493
FLUID PRESSURE REMOTE CONTROL DEVICES AND SYSTEMS
Filed Oct. 21, 1965  11 Sheets-Sheet 11

INVENTOR.
WAYNE B. EASTON

United States Patent Office 3,348,493
Patented Oct. 24, 1967

3,348,493
FLUID PRESSURE REMOTE CONTROL
DEVICES AND SYSTEMS
Wayne B. Easton, South Bend, Ind., assignor to Char-Lynn Company, Minneapolis, Minn., a corporation of Minnesota
Filed Oct. 21, 1965, Ser. No. 515,508
20 Claims. (Cl. 103—130)

This invention relates generally to fluid pressure control devices and systems in which the motion of an actuator motor is remotely controllable. The invention relates more particularly to hydrostatic vehicle steering systems of the type wherein there is no operative mechanical connection between the operator's steering or control wheel and the steerable wheels of the vehicle.

Hydrostatic or full fluid power steering systems of a known type have a control valve which operates in combination with a metering motor to supply metered amounts of fluid to an actuator motor which is attached to the steerable wheels of a vehicle. The metered fluid supplied to the actuator motor corresponds to the turn rate imparted to the steering wheel by the operator.

A main object of the present invention is to provide a new and improved hydrostatic control devices and systems of the type referred to in which there is metering of both the fluid supplied to the actuator motor and the fluid exhausted from the actuator motor.

Other objects and advantages will become apparent from the following specification, appended claims and attached drawings.

In the drawings:

FIG. 1 is a schematic drawing of a fluid pressure remote control system of the type to which the present invention pertains;

FIG. 2 is a longitudinal sectional view of a metering unit taken on line 2—2 of FIG. 6 which illustrates a first embodiment of the invention;

FIG. 3 is a view of a commutator valve in the metering unit of FIG. 2 shown in the same position it is shown in FIG. 2;

FIG. 4 is a view of a control valve in the metering unit of FIG. 2 shown in the same position it is shown in FIG. 2;

FIGS. 5 to 11 are sectional views taken on lines in FIG. 2 which correspond to the figure numbers.

FIG. 12 is a longitudinal sectional side view of a metering unit taken on line 12—12 of FIG. 18 which illustrates a second embodiment of the invention;

FIG. 13 is a plane view of a commutator valve in the metering unit of FIG. 12;

FIGS. 14 to 22 are sectional views taken on lines in FIG. 12 which correspond to the figure numbers.

FIG. 23 is a longitudinal sectional view of a metering unit taken on line 23—23 of FIG. 29 which illustrates a third embodiment of the invention;

FIG. 24 is a side view of a distributor valve in the metering unit of FIG. 23 shown in the same position it is shown in FIG. 23;

FIGS. 25 to 33 are transverse sectional views taken on lines in FIG. 23 which correspond to the figure numbers;

FIG. 34 is a longitudinal sectional side view of a metering unit taken on line 34—34 of FIG. 38 which illustrates a fourth embodiment of the invention;

FIG. 35 is a plan view of a distributor valve in the metering unit on FIG. 34;

FIG. 36 is a plan view of a control valve in the metering unit shown in FIG. 34; and FIGS. 37 to 45 are transverse sectional views taken on lines in FIG. 34 which correspond to the figure numbers.

Figure 9:
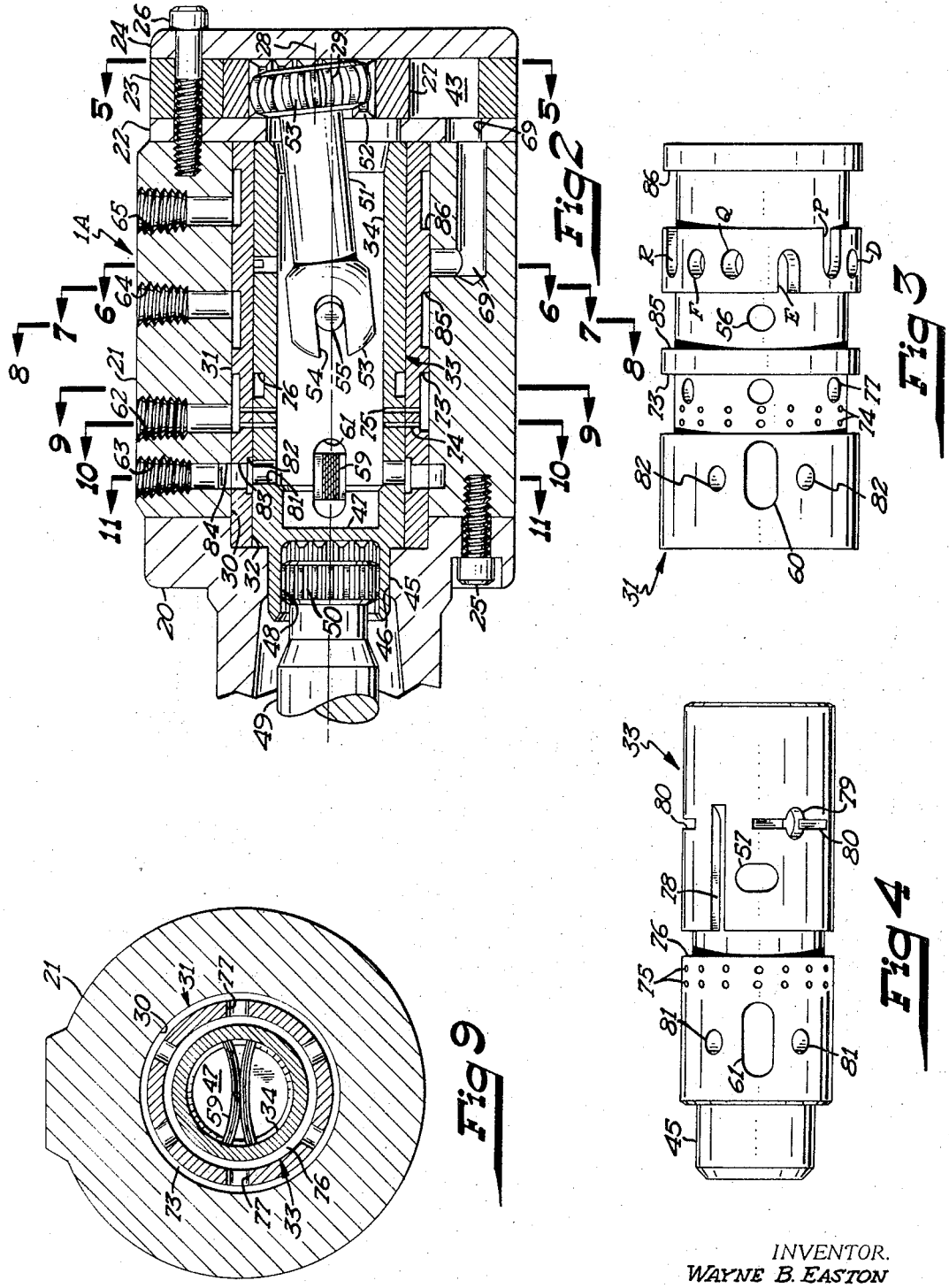
Figure 10:
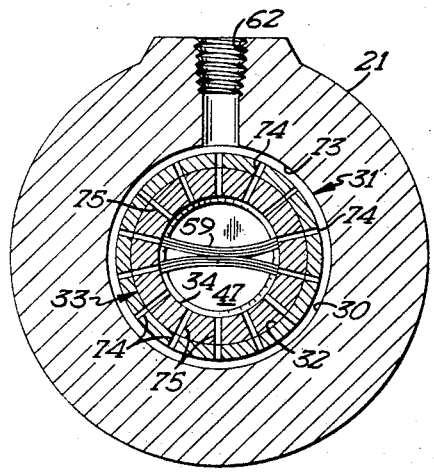
Figure 11:
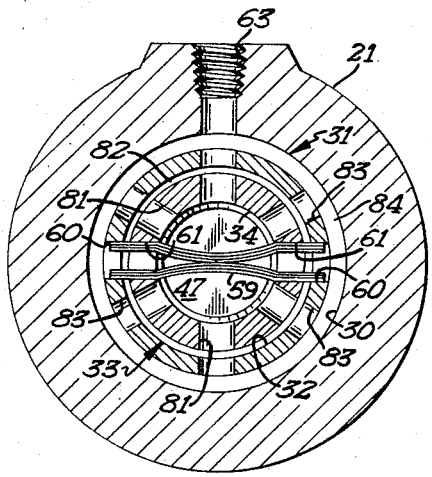
Figure 15:
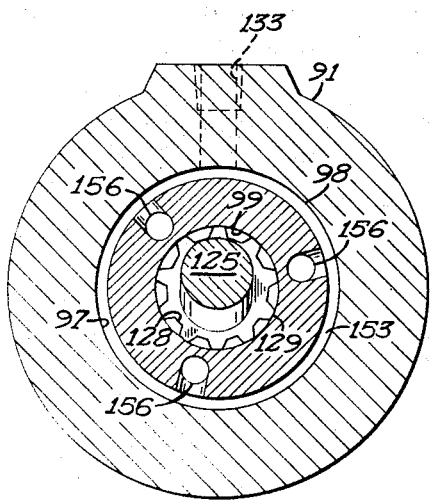
Figure 16:
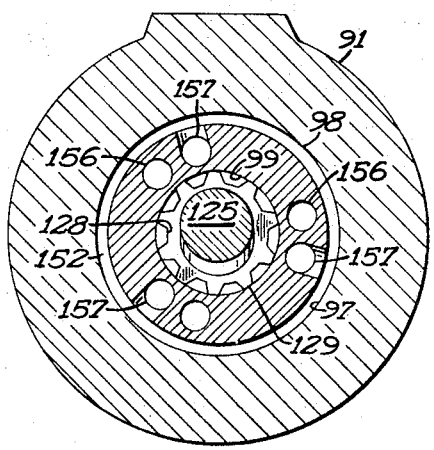
Figure 17:
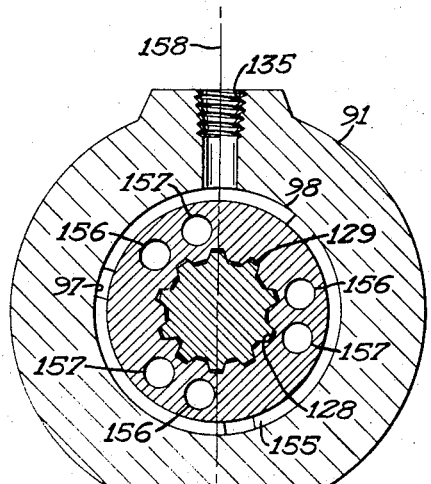

FIG. 1 is a schematic drawing of a fluid pressure remote control system of the type to which the present invention pertains. In this figure a metering unit 1 comprises a metering motor and a valve for controlling the flow of fluid to and from the metering motor. A hand control 2 is shown for operating the valve which may be a steering wheel if the invention is embodied in a vehicle steering system. The system includes a driven pump or compressor 3, a fluid reservoir 4, and a remotely controlled actuator motor 5. The metering unit 1 has a pair of inlet and outlet ports 6 and 7 and a pair of ports 8 and 9 each of which is alternately an inlet and outlet port depending on the direction of rotation imparted to the hand control 2. Pump or compressor 3 supplies fluid under pressure to inlet 6 through a conduit 10 and fluid from the outlet 7 is returned to the reservoir 4 through a conduit 11.

A check valve 12 is provided between conduits 10 and 11 which permits the metering unit 1 to function as a manually operated pump in a known manner to by-pass pump 3 and draw fluid directly from reservoir 4 in the event that the pump 3 becomes inoperative because of a power failure. Check valve 12 may be incorporated in the casing of metering unit 1 if desired.

Remotely controlled actuator motor 5 is illustrated as a cylinder having mounted for axial reciprocatory movement therein a piston equipped plunger rod 13. If the system is utilized in a vehicle steering unit the plunger rod 13 could be connected by means of the usual steering linkage (not shown) to the steerable wheels of the vehicle. Actuator motor 5 has ports 14 and 15 at opposite ends thereof so that fluid may be received and exhausted at each end thereof through conduits 16 and 17 under the control of the metering unit 1 to control the direction of movement of the plunger rod 13. Actuator motor 5 may have various forms within the scope of the invention including the form of a rotary motor which may be caused to rotate in either direction for an indefinite period of time. The invention is thus not limited to being used for steering apparatus and may be used in any installation where the desired end result is the control of a remotely located fluid pressure operated motor.

FIGS. 2 to 11 show a metering unit 1A which illustrates a first embodiment of the invention. The metering unit 1A has a casing which comprises an annular flanged end plate 20, an annularly and cylindrically shaped section 21, an annular plate 22, a gerotor casing section 23 and an end cover plate 24.

Casing sections 20 and 21 are held together in axial alignment by a plurality of circumferentially spaced bolts 25. End plate 24, which serves as a side plate for the gerotor casing section 23, and casing sections 21 to 23 are attached together and held in axial alignment by a plurality of circumferentially spaced bolts 26.

The shape of gerotor casing section 23 (see FIG. 5) is generally cylindrical and annular and has a plurality of internal teeth which will be referred to in detail further on. An externally toothed star member 27 having at least one fewer teeth than casing section 23, which may be referred to as a ring member 23, has the teeth thereof in meshing engagement with the teeth of ring member 23. Star member 27 partakes of a hypocycloidal movement so that the axis 28 of star member 27 travels in an orbit about the axis 29 of ring member 23.

Casing sections 20 and 21 jointly form a bore 30 and rotatably disposed and supported in bore 30 is a cylindrically and annularly shaped commutator type valve 31 which has a bore 32. Rotatably disposed and supported in the bore 32 of valve 31 is a cylindrically shaped control valve 33 which has a bore 34 which bore, as well as bores 30 and 32, is coaxial relative to ring member axis 29.

With reference to FIGS. 2 and 5, the gerotor casing section 23, which in effect is the ring member 23, has a plurality of internal teeth 35. Externally toothed star member 27, having at least one fewer teeth 36 than ring member 23, is disposed eccentrically in the chamber or space formed and surrounded by ring member 23. During orbital movement of star member 27 relative to ring member 23 the teeth 36 thereof intermesh with the ring member teeth 35 to form expanding and contracting chambers which for the position of the star 27 shown in FIG. 5 are the chambers 37 and 43.

Casing section 22 has a bore which is concentric relative to ring axis 29 and is of small enough diameter so that the resulting annular face which abuts gerotor casing section 23, along with cover plate 24, form sides for the gerotor chamber so that the expanding and contracting chambers 37 to 43 formed between the teeth of the gerotor star and ring members 27 and 23 will be closed for all orbital positions of the star member 27.

With reference to FIGS. 5 and 6, a vertical centerline 44 incidentally represents the line of eccentricity for the star member 27 for that particular position of the star member relative to the ring member 23. The line of eccentricity is defined herein as a line or plane which is perpendicular to and intersects the star and ring axes 28 and 29 for all orbital positions of the star 27. During orbital movement of the star member 27, assuming the orbital movement is clockwise, the indicated chambers 37 to 39 on the left side of the line of eccentricity would be expanding and the indicated chambers 40 to 42 on the right side would be contracting. Chamber 43 is fully open and will begin to expand or contract in the next instant depending on the orbiting direction of the star 27. In the operation of the device illustrated, fluid under pressure is directed to the expanding cells on one side of the line of eccentricity and exhausted from the contracting cells on the other side of said line. The valving arrangement which facilitates the feeding and exhausting of the cells 37 to 43 will be described further on herein.

Control valve 33 has an annularly shaped collar 45 which rotatably engages a center bore 46 of casing section 20. A fluid tight partition 47 is disposed adjacent collar 45 and the bore 48 to the left of the partition 47 is provided with splines. A shaft 49 having a splined end portion 50 which engages the splines of valve bore 48 is provided for rotating the control valve 33. If the metering unit is to be used in a vehicle steering system, a steering wheel (not shown) would be attached to the shaft 49.

A shaft 51 extends between and mechanically connects star 27 and commutator valve 31 in driving relation. Star 27 has a bore which is concentric relative to the teeth 36 thereof and the star bore is provided with a plurality of circumferentially arranged, axially extending teeth or splines 52. Shaft 51 has an enlarged head 53 at the star end thereof which has a frustospherically shaped portion and is provided with splines which are equal in number to and mesh with splines 52 of the star 27. The other end of shaft 51 has a head 53 with a frustospherically shaped portion of the same diameter as the bore 24 of control valve 33 and has a slot 54. A pin 55 is rigidly attached to commutator valve 31 by being press fitted in holes 56 in valve 31 on opposite sides thereof and extends diametrically across valve bore 32. Pin 55 has a diameter which is equal to the width of shaft slot 54 and is disposed in and accommodated by the slot 54.

Circumferentially extending and diametrically opposed slots 57 and 58 (see FIGS. 4 and 8) are provided on opposite sides of control valve 33 to accommodate the presence of pin 55 and to provide for limited relative rotary movement between valves 31 and 33. When control valve 33 is rotated in either direction from its neutral position shown in FIGS. 2 to 11, the pin 55 becomes engaged by opposite ends of the opposed slots 57 and 58 after which the continued rotary movement of the control valve 33 will cause similar rotary movement to be imparted to the valve 31.

For the purpose of yieldingly urging the control valve 33 to assume its neutral position relative to valve 31 wherein slots 57 and 58 will be centered relative to pin 55, there is provided a plurality of leaf springs 59 (see FIG. 11) which extend radially through a pair of diametrically opposed holes 60 in commutator valve 31 and a pair of diametrically opposed holes 61 in control valve 33.

Shaft 51 is a universal joint type of shaft which functions to cause commutator valve 31 to rotate in synchronism with the rotational movement of star 27. In operation a star member 27 having six teeth will make one revolution about its own axis 28 for every six times the star member orbits in the opposite direction about the axis 29 of the ring member 23. Thus, the right end of the shaft 51 has both orbital and rotational movement in common with the star member 27 while the left end of the shaft has only rotational movement in common with commutator valve 31.

Assuming for the purpose of illustration that no fluid is being supplied to the metering unit 1A, the mechanical operation of the metering unit would be such that the turning of shaft 49 in either direction would cause turning of control valve 33 relative to commutator valve 31 against the small resistance of spring 59 until the opposite ends of valve slots 57 and 58 engage pin 55. The continued rotation of shaft 49 causes valves 31 and 33 to rotate together as a unit and causes the turning of shaft 51 through pin 55 which is attached to valve 31. The turning of shaft 51 causes star 27 to orbit relative to ring axis 29 in the opposite direction from the rotation of shaft 49. When the turning force is removed from shaft 49, control valve 33 will be rotated slightly in the opposite direction by springs 59 so as to again assume its neutral position relative to commutator valve 31.

It is known that when orbiting type gerotor are used for fluid pressure devices such as pumps and motors, the fluid feeding and exhausting of the gerotor must be performed at the orbiting speed of the orbiting gear because each of the chambers formed between the gears is expanded and contracted once during each orbit of the orbiting gear. In U.S. Patent 2,821,171 (Re. 25,291) a gerotor type fluid pressure device is disclosed having a commutator valve which corresponds to commutator valve 31 that rotates in synchronism with the rotational movement of the orbiting gear. As the rotational speed of a gerotor unit is only a fraction of the orbital speed, a commutator type valve may be referred to as a slow speed valve. Valve passages are provided in a commutator valve in a unique manner which permits fluid to be supplied to and exhausted from a gerotor in timed sequences to meet the requirements of the plurality of chambers which are formed during each orbiting cycle despite the fact that the rotational speed of the slow speed commutator valve is only a fraction of the orbiting speed of the gerotor unit. In the above mentioned patent the slow speed commutator valve is referred to as operating like a commutator because its fluid feeding and exhausting characteristics in relation to an orbital type gerotor are analogous in some respects to electrical commutation. In this specification and appended claims, therefore, the words "commutator" and "commutation" means, applied to the field of hydraulics, the particular type of slow speed valve disclosed in said patent and the particular feeding and exhausting characteristics in relationship to an orbital type gerotor.

Fluid inlet and outlet ports 62 and 63 are provided in casing section 21 which extend therethrough and open into the bore 30. Two ports 64 and 65 are provided in casing section 21 each of which is alternately an inlet port and an outlet port. Ports 64 and 65 extend through casing section 21 and open into bore 30. Ports 62 to 65 correspond respectively to the ports 6 to 9 of the metering unit 1 of FIG. 1.

Commutator valve 31, control valve 33 and casing sections 21 and 22 are provided with fluid passages through which fluid may be conveyed from the inlet port 62 and a selected one of the ports 64 or 65 to the expanding chambers of the gerotor and through which fluid may be conveyed from the collapsing chambers of the gerotor to the outlet port 63 and the other of the ports 64 or 65.

Casing sections 21 and 22 have formed jointly therein a plurality of generally axially extending, circumferentially arranged and spaced passages 66 to 72 illustrated as being seven in number which is equal to the number of teeth 35 of the ring member 24. The passages 66 to 72 extend from points between the ring member teeth 35 in the chamber formed by the ring member 23 (see FIG. 5) through casing sections 21 and 22 and open radially into the bore 30 formed in casing sections 20 and 21 where fluid communication is established between passages 66 to 72, which are stationary, and passages to be described in the commutator valve 31. The passages in commutator valve 31 which have fluid communication with stationary passages 66 to 72 may be noted in FIG. 6. These passages comprise a first set of six circumferentially arranged passages A to F and a set of six circumferentially arranged passages M to R which are alternately spaced relative to the passages A to F. Upon rotation of valve 31 each of the passages A to F and M to R therein register successively in fluid communication with the passages 66 to 72 in casing section 21.

For convenience, the plane of FIG. 6 in which there is fluid communication between casing passages 66 to 72 and valve passages A to F and M to R will be referred to as the commutating plane. In the commutating plane the outer circumference of commutating valve 31 is divided into twenty-four sections and twelve alternately spaced sections are completely occupied by the passages A to F and M to R. The casing passages 66 to 72 have the same circumferential dimensions in the commutating plane adjacent the outer circumference of commutating valve 31 as do the valve passages A to F and M to R.

In the operation of valve 31 as a commutator valve, fluid flows during rotation thereof through some of the passages A to F to expanding chambers of the gerotor and from contracting chambers of the gerotor to some of the passages M to R, or vice versa depending on the direction of rotation of valve 31. For the position of the star 27 shown in FIG. 5 and the valve 31 shown in FIG. 6, there could be two different instantaneous flow conditions depending on the direction of rotation of the valve 31. If the direction of rotation of valve 31 is counterclockwise as viewed in FIG. 6, fluid would be flowing from valve passages P, Q and R through casing passages 70, 71, and 72 to chambers 37, 38 and 39 which would be expanding. The expansion of the chambers 37 to 39 causes star 27 to orbit in a clockwise direction and cause collapsing of the chambers 40 to 42 from which fluid would be flowing through casing passages 66 to 68 to the valve passages A to C. If the direction of valve 31 were reversed, the direction of flow would be the reverse of that described. For the position of star 27 shown in FIG. 5, chamber 43 is fully expanded at that instant there is neither flow to or from chamber 43. At the next instant, however, the flow will be from the chamber 43 to the valve passage O if the rotation of the valve 31 is clockwise or from the valve passage D to the chamber 43 if the rotation of the valve 31 is counterclockwise.

The above description of fluid flow is only for an instantaneous condition. As long as valve 31 rotates in one direction, however, fluid will always be supplied to expanding chambers from valve passages on the same side of the line of eccentricity 44 and fluid will always be exhausted from contracting chambers through valve passages on the other side of said line. Furthermore, the flow in the set of valve passages A to F will always be in the same direction, either to or from the gerotor, depending on the direction of rotation of valve 31. The same is true of the set of valve passages M to R except that the direction of fluid flow in passages M to R will always be the opposite of the direction of fluid flow in the passages A to F.

Commutator valve 31 has an annular channel 73 which registers axially with inlet port 62. A plurality of radial holes 74 are provided in channel 73 which extend through the valve 31 and register with a like number of radial holes 75 in control valve 33 when the control is in its neutral position as shown. Holes 75 open into control valve bore 34 and fluid which enters bore 34 is discharged to outlet port 63 through passages which will be described further on. The alignment or registering of holes 75 and 75 provide an open center condition when control valve 33 is in its neutral position so that fluid under pressure in inlet port 62 is diverted directly to the outlet port 63. The turning of the control valve 33 in either direction a predetermined amount as determined by the size of slots 57 and 58 causes holes 73 and 74 to move out of alignment and the pressurized fluid which then flows into valve channel 73 from inlet port 62 becomes available to furnish power for a control function such as steering.

Control valve 33 has an annular channel 76 which registers axially with annular channel 73 and a plurality of radially extending holes 77 in channel 73 of valve 31 which provide fluid communication between annular channels 73 and 76. Control valve 33 is illustrated as having three longitudinally extending, circumferentially spaced passages 78 which have fluid communication with annular channel 76 and extend to the right at least to the commutating plane where casing passages 66 to 72 open into the casing bore 30. Control valve 33 has three radially extending exhaust holes 79 (see FIG. 6) which communicate with the bore 34 of valve 33 and are circumferentially spaced relative to longitudinal passages 78. A transversely extending slot 80 (see FIGS. 4 and 6) is formed across each hole 79 which terminates a circumferential distance from each of the passages 78 adjacent thereto equal to approximately the width of a passage 78.

Referring to the two sets of valve passages A to F and M to R, passages B, D and F of one set and passages M, O and Q of the other set are holes which extend radially through valve 31 from the exterior to the interior thereof. Referring to FIG. 6, when control valve 33 is in its neutral position as shown, longitudinal passages 78 are respectively between the passages of each of the pairs of passages MB, OD and QF. If control valve 33 is rotated in a counterclockwise direction until stopped relative to valve 31 by pin 55, passages 78 would be aligned with passages F, B and D and exhaust holes 78 would be in fluid communication with passages Q, M and O. With this setting of control valve 33, and with commutator valve 31 in the position shown in FIG. 6, pressurized fluid from inlet port 62 would flow through annular channel 73, commutator valve holes 77, control valve annular channel 76 and axially extending passages 78, commutator valve passage B, casing passage 67 to expanding gerotor chamber 41 and fluid from contracting gerotor chamber 38 would flow through casing passage 71 through valve passage Q and one of the control valve passages 79 to the interior of valve 33 and out fluid outlet port 63.

Fluid outlet port 63 has constant fluid communication with the interior bore 34 of valve 33 through a plurality of circumferentially spaced holes 81 in valve 33 (see FIG. 11), through an annular channel 82 in the bore 32 of valve 31, through a plurality of circumferentially spaced holes 83 in valve 31, and through annular channel 84 in the bore 30 of casing section 21. The holes 81 and 83 and the annular channels 82 and 84 are all in axial alignment with the fluid outlet port 63. The head 53 of shaft 51 is formed so that it does not block or prevent the flow of fluid from the right end of the valve bore 34 to the fluid outlet port 63.

Referring now to ports 64 and 65, commutator valve 31 has two annular channels 85 and 86 which register axially with ports 64 and 65 and which are on opposite sides of the openings of casing passages 66 to 72 in casing bore 30 which are in the commutating plane. The annular land which separates annular channels 85 and 86 has six bays or passages therein which are recessed relative to the channels 85 and 86 so as to have fluid communication with one or the other of the channels 85 or 86 and which constitute the passages A, N, C, P, E and R of the two sets of passages referred to above. The passages A, C and E have constant fluid communication with the port 64 through annular channel 85, and the passages N, P and R have constant fluid communication with the port 65 through annular channel 86. If a remotely located motor actuator such as the actuator 5 in FIG. 1 is connected to ports 64 and 65, the metering unit 1A will function to supply fluid to one side of it through passages A, C and E and port 64 and exhaust fluid from the other side of it through port 65 and passages N, P and R, or vice versa, depending on the direction that control valve 33 is rotated from its neutral position.

In the operation of the metering unit 1A, control valve 33 is rotated until it is stopped by pin 55 and thereafter valves 31 and 33 rotate together as a unit with a commutating action taking place between the passages A to F and M to R of valve 31 and the passages 66 to 72 in the casing. Assuming that control valve 33 is rotated clockwise, as viewed in FIG. 6, the passages 78 therein connected to the inlet port 62 will be in alignment with commutator valve passages B, D and F and commutator passages M, O and Q will be in fluid communication with the outlet port 63 through the exhaust holes 79 in control valve 33. At the instant when commutator valve 31 is in its position as shown in FIG. 6 and when star 27 is in its position as shown in FIG. 5, the flow conditions will be that fluid from the inlet port 62 will flow through commutator valve passage B and through casing passage 67 to gerotor chamber 41 which is expanding. Expanding chambers 40 and 42 which at that instant are in fluid communication with port 64 through casing passages 66 and 68, through commutator valve passages A and C, and through annular channel 85 will draw fluid in through port 64 by reason of the suction action of the expanding chambers 40 and 42. On the left side of the line of eccentricity 44 chamber 38 is contracting and the fluid therein will be discharged to the outlet port 63 through casing passage 71, valve passage Q, and exhaust hole 79 of control valve 33. Chamber 37 is also contracting at that instant and the fluid therefrom will be exhausted under pressure to port 65 through casing passage 70, commutator passage P and annular channel 86. Thus at that instant a metered amount of fluid from the gerotor is being delivered to the port 65 and a metered amount of fluid is being received by the gerotor through actuator port 64. Thus an actuator motor, such as actuator motor 5 of FIG. 1, connected to ports 64 and 65 would have both the fluid delivered thereto and fluid exhausted therefrom metered by the expanding and contracting chambers formed in the gerotor. The turning of the control valve in the opposite counterclockwise direction would produce similar fluid flow conditions except that the flow of fluid to and from the ports 64 and 65 would be reversed.

As long as continued rotation is imparted to control valve 33 by shaft 49 in either direction so that registration is maintained between the inlet passages 78 and one set of passages BDF or MOQ, commutator valve 31 will continue to rotate and metered amounts of fluid will be supplied to and exhausted from an actuator motor connected to ports 64 and 65. When the rotation of shaft 49 is stopped, the commutator valve 31 will continue its rotation for only a few additional degrees until it again assumes a neutral position relative to control valve 33.

Other arrangements of the commutator passages A to F and M to R of the commutator valve 31 are also within the scope of the invention. In the metering unit 1A the arrangement is such that in operation each of the ports 62 to 65 have three commutator valve passages in fluid communication therewith. If control valve 33 is turned to the right the series of passages A, M, B, N, C, O, D, P, E, Q, F, and R would be connected respectively to the ports 64, 63, 62, 65, 64, 63, 62, 65, 64, 63, 62 and 65. Other arrangements could be provided for a gerotor having a 7 to 6 teeth ratio wherein either four or eight of the commutator passages A to R would be connectable to the inlet and outlet ports 62 and 63 during operation of the device instead of six as illustrated. If four of the twelve passages A to R are connectible to the pressure and exhaust ports 62 and 63, eight of the passages would be connected to the ports 64 and 65. Likewise, if eight of the twelve passages A to R are connectable to the inlet and outlet ports 62 and 63, only four of the passages would be available for connection to the ports 64 and 65.

FIGS. 12 to 22 show a metering unit 1B which illustrates a second embodiment of the invention. The metering unit 1B has a casing which comprises an annularly and cylindrically shaped section 91, an annular plate 92, a gerotor casing section 93 and an end cover plate 94. End plate 94, which serves as a side plate for the gerotor casing section 93, and casing sections 91 to 93 are attached together and held in axial alignment by a plurality of circumferentially spaced bolts 95.

Gerotor casing section 93 (see FIG. 14) is generally cylindrical and annular and has a plurality of internal teeth. An externally toothed star member 96 having at least one fewer teeth than casing section 93, which may be referred to as a ring member 93, has the teeth thereof in meshing engagement with the teeth of ring member 93.

The ring and star members 93 and 96 and casing plates 92 and 94 may be identical to the corresponding parts in the first embodiment of the invention and thus will not be described in detail.

Casing section 91 has a bore 97 and slidably disposed and supported in bore 97 for axial movement is a cylindrically shaped commutator type valve 98 which has a concentrically disposed bore 99 at the right end thereof.

Valve 98 has cylindrical portions 101 and 102 of reduced diameters at opposite ends thereof and a shaft portion 103 of further reduced diameter at the left end thereof. Casing section 91 has counterbores 104 and 105 at opposite ends thereof. The middle portion of valve 98 between portions 101 and 102 thereof is equal in length to the distance counterbores 104 and 105 are spaced apart and when valve 98 is in its neutral position as shown in FIG. 12, the middle portion of valve 98 between portions 101 and 102 thereof is centered between counterbores 104 and 105. The lengths of counterbores 104 and 105 are sufficient to permit axial movement of the valve 98 in either axial direction relative to its neutral position.

Casing section 91 has an annular flange 106 at the left end thereof. A steering wheel 107 having a hub 108 with a bore 109 and a counterbore 110 is attached to casing section 91 so as to be both axially fixed and in relatively rotatable relation relative to casing section 91. Steering wheel 107 is so attached to casing section 91 by having casing flange 106 rotatably disposed in the hub counterbore 110 and by providing an articulated collar 111 which slidably engages casing flange 106 and is fixedly attached to the hub 108 with bolts 112.

A sleeve member 114 having an annular flange 115 is disposed between hub 108 and valve shaft portion 103 and is fixedly attached to hub 108 with screws 116. Shaft portion 103 has a diametrically extending bore 117 and press fitted into bore 117 is a pin 118. Sleeve member 114 has inclined camming slots 119 and 120 on diametrically opposite sides thereof each having approximately the same width as the pin 118. Upon turning the wheel 107 in either direction relative to casing section 91, valve 98 will be moved axially in a corresponding direction relative to its neutral position in response to the action of the camming slots 119 and 120 on pin 118.

Annular ring shaped members 121 and 122 are provided at opposite ends of valve 98 in the annular spaces formed between the casing counterbores 104 and 105 and the valve portions 101 and 102. Coil springs 123 and 124 are disposed in these annular spaces which biasingly engage the annular ring 121 and steering wheel hub 108 at one end and annular ring 122 and the casing valve plate 92 at the other end. Springs 123 and 124 function to bias valve 98 towards its neutral position and to cause the valve to move to and be maintained in its neutral position after the removal of a turning force applied to the steering wheel 107 has caused axial movement of the valve.

A shaft 125 extends between and mechanically connects star 96 and commutator valve 98 in driving relation. Star 96 has a bore which is concentric relative to the teeth thereof and the star bore is provided with a plurality of circumferentially arranged, axially extending teeth or splines 126. Shaft 125 has an enlarged head 127 at the star end thereof which has a frustospherically shaped portion having the same diameter as the star bore and is provided with splines which are equal in number to and mesh with splines 126 of the star 96. Valve bore 99 is provided with a plurality of circumferentially arranged, axially extending teeth or splines 128. The other end of shaft 125 has a head 129 with a frustospherically shaped portion of the same diameter as the bore 99 of valve 98 and is provided with splines which are equal in number to and mesh with the splines 128 in the valve bore 99. The width of shaft head 127 is sufficient relative to the width of gerotor star 96 so as to prevent axial movement of shaft 125. The length of valve splines 128 is sufficient to permit axial movement of valve 98 as described above.

Shaft 125 is a universal joint type of shaft which functions to cause commutator valve 98 to rotate in synchronism with the rotational movement of star 96. In operation a star member 96 having six teeth will make one revolution about its own axis 130 for every six times the star member orbits in the opposite direction about the axis 131 of the ring member 93. Thus, the right end of the shaft 125 has both orbital and rotational movement in common with the star member 96 while the left end of the shaft has only rotational movement in common with commutator valve 98.

Assuming for the purpose of illustration that no fluid is being supplied to the metering unit 1B, the mechanical operation of the metering unit would be such that the turning of steering wheel 107 in either direction would cause turning of hub 108 relative to casing section 91 and the camming slots 119 and 120 would engage pin 118 to cause valve 98 to move axially in one direction or the other against the small resistance of one of the springs 123 or 124 until the opposite ends of slots 119 and 120 engage pin 118 to prevent further relative movement between steering wheel 107 and valve 98. The continued rotation of steering wheel 107 would cause the steering wheel and valve 98 to rotate together as a unit and cause the turning of shaft 125 through valve splines 128. The turning of shaft 125 causes start 96 to orbit relative to ring axis 131 in the opposite direction from the rotation of shaft 125. When the turning force is removed from the steering wheel 107, one of the springs 123 or 124 will move valve 98 axially to its neutral position and steering wheel 107 will be rotated slightly in the opposite direction by reason of the reverse camming action imparted to the slots 119 and 120 by the axial movement of pin 118.

Fluid inlet and outlet ports 132 and 133 are provided in casing section 91 which extend therethrough and open into the bore 97. Two ports 134 and 135 are provided in casing section 91 each of which is alternately an inlet port and an outlet port. Ports 134 and 135 extend through casing section 91 and open into bore 97. Ports 132 to 135 correspond respectively to the ports 6 to 9 of the metering unit 1 of FIG. 1.

Commutator valve 98 and casing sections 91 and 92 have fluid passages through which fluid may be conveyed from the inlet port 132 and a selected one of the ports 134 or 135 to the expanding chambers of the gerotor and through which fluid may be conveyed from the collapsing chambers of the gerotor to the outlet port 133 and the other of the ports 134 or 135.

Casing sections 91 and 92 have formed jointly therein a plurality of generally axially extending, circumferentially arranged and spaced passages 136 to 142 illustrated as being seven in number which is equal to the number of teeth of the ring member 93. The passages 136 to 142 extend from points between the ring member teeth in the chamber formed by the ring member 93 (see FIG. 14) through casing sections 92 and 91 and open radially into the bore 97 of the casing section 91 where fluid communication is established between passages 136 to 142, which are stationary, and passages to be described in the commutator valve 98. The passages in commutator valve 98 which have fluid communication with stationary passages 136 to 142 may be noted in FIG. 18. These passages comprise a first set of six circumferentially arranged passages G to L and a set of six circumferentially arranged passages S to X which are alternately spaced relative to the passages G to L. Upon rotation of valve 98 each of the passages G to L and S to X therein register successively in fluid communication with the passages 136 to 142 in casing section 91.

In this embodiment of the invention the passages G to L and S to X have the form of recesses with each of the recesses being elongated in an axial direction so that fluid communication is facilitated between passages G to L and S to X and passages 136 to 142 for all axial positions of the valve 98.

Figure 18:
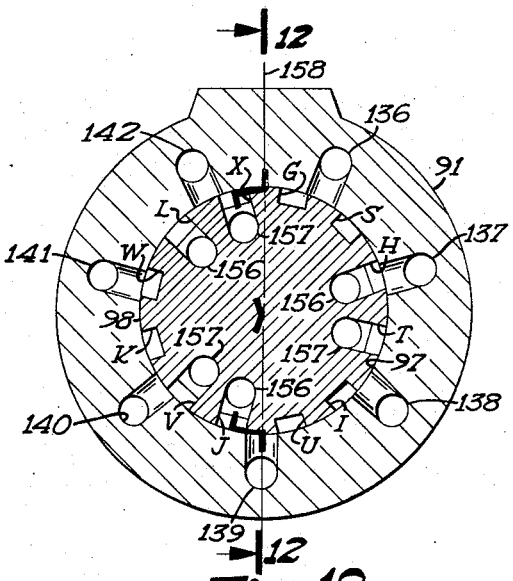
Figure 19:
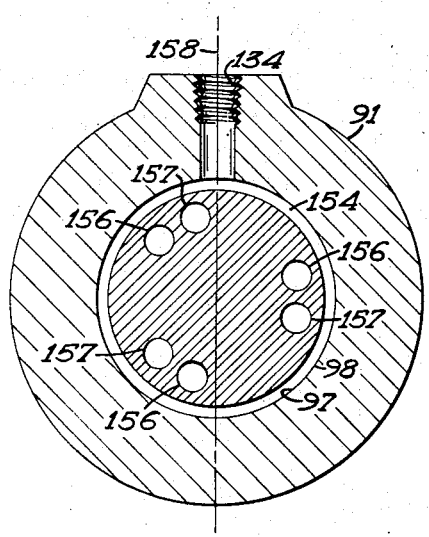
Figure 20:
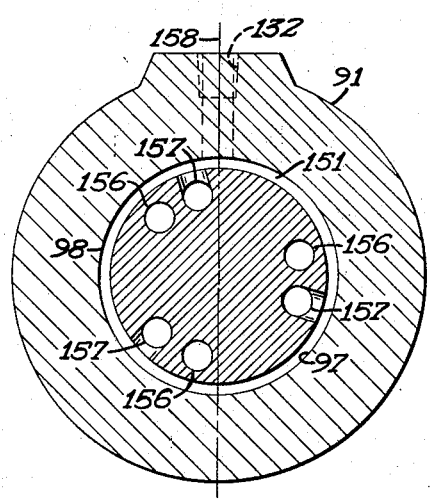
Figure 28:
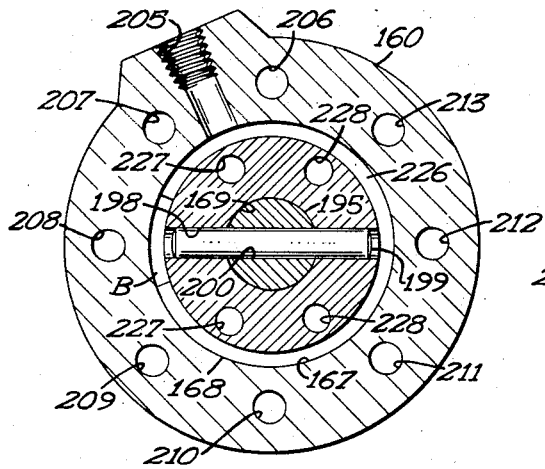

For convenience, the plane of FIG. 18 in which there is fluid communication between casing passages 136 to 142 and valve passages G to L and S to X will be referred to as the commutating plane. In the commutating plane the outer circumference of commutating valve 98 is divided into twenty-four sections and twelve alternately spaced sections are completely occupied by the passages G to L and S to X. The casing passages 136 to 142 have the same circumferential dimensions in the commutating plane adjacent the outer circumference of commutating valve 98 as do the valve passages G to L and S to X.

In the operation of valve 98 as a commutator valve, fluid flows during rotation thereof through some of the passages G to L to expanding chambers of the gerotor and from contracting chambers of the gerotor to some of the passages S to X, or vice versa depending on the direction of rotation of valve 98. For the positions of the star 96 shown in FIG. 14 and the valve 98 shown in FIG. 18, there could be two different instantaneous flow conditions depending on the direction of rotation of the valve 98. If the direction of rotation of valve 98 is counterclockwise as viewed in FIG. 18, fluid would be flowing from valve passages V, W and X through casing passages 140 to 142 to chambers 143 to 145 which would be expanding. The expansion of the chambers 143 to 145 causes star 96 to orbit in a clockwise direction and cause collapsing of the chambers 146 to 148 from which fluid would be flowing through casing passages 136 to 138 to the valve passages G, H and I. If the direction of valve 98 were reversed, the direction of flow would be the reverse of that described. For the position of star 96 shown in FIG. 14, chamber 149 is fully expanded and at that instant there is neither flow to or from chamber 149. At the next instant, however, the flow will be from the chamber 149 to the valve passage U if the rotation of the valve 98 is clockwise or from the valve passage J to the chamber 149 if the rotation of the valve 98 is counterclockwise.

The above description of fluid flow is only for an instantaneous condition. As long as valve 98 rotates in one direction, however, fluid will always be supplied to expanding chambers from valve passages on the same side of the line of eccentricity 158 and fluid will always be exhausted from contracting chambers through valve passages on the other side of said line. Furthermore, the flow in the set of valve passages G to L will always be in the same direction, either to or from the gerotor, depending on the direction of rotation of valve 98. The same is true of the set of valve passages S to X except that the direction of fluid flow in passages S to X will always be the opposite of the direction of fluid flow in the passages G to L.

The relationship that commutating valve passages G to L and S to X have with ports 132 to 135 will now be described.

Commutator valve 98 has two annular channels 150 and 151 which straddle and have fluid communication with inlet port 132 when valve 98 is in its neutral position. Commutator valve 98 also has two annular channels 152 and 153 which straddle and have fluid communication with outlet port 133 when valve 98 is in its neutral position. When valve 98 is moved to the right from its neutral position the annular channels 150 and 152 are respectively in fluid communication with inlet and outlet ports 132 and 133 and when moved to the left from the neutral position the annular channels 151 and 153 are respectively in fluid communication with inlet and outlet ports 132 and 133.

Commutator valve 98 also has two annular channels 154 and 155 which are respectively in fluid communication with ports 134 and 135 for all axial positions of valve 98.

Valve 98 has six axially extending passages in the body thereof which are three passages 156 which connect annular channels 150 and 153 and three passages 157 which connect annular channels 151 and 152.

In the commutating plane illustrated in FIG. 18 the passages 156 are respectively connected by short radial passages to valve passages H, J and K and the passages 157 are connected by short radial passages to valve passages T, V and X.

When valve 98 is in its neutral position fluid under pressure at the inlet port 132 will flow into annular channels 150 and 151, through all of the passages 156 and 157 to the annular channels 152 and 153 and out the outlet port 162. This provides an open center condition when valve 98 is in its neutral position so that fluid under pressure in inlet port 132 is diverted directly to the outlet port 133. The turning of steering wheel 107 in either direction causes axial movement of valve 98. If valve 98 were caused to move to the right, annular channel 150 would be aligned with inlet port 132 and, as annular channel 153 would be blocked, fluid would be caused to flow through passages 156 to valve passages H, J and K. At the same time annular channel 152 would be aligned with outlet port 133 and, as annular channel 151 would be blocked, fluid would be caused to flow from passages T, V and X through passages 157 to outlet port 133. If valve 98 were moved to the left the described flow would be reversed with fluid from inlet port 132 flowing to passages T, V and X and fluid from passages H, J and K flowing to outlet port 133.

Referring now to ports 134 and 135, the annular land which separates annular channels 154 and 155 of commutating valve 98 has six bays or passages therein which are recessed relative to the channels 154 and 155 so as to have fluid communication with one or the other of the channels 154 or 155 and which constitute the passages G, S, I, U, K, and W of the two sets of passages referred to above. The passages G, I and K have constant fluid communication with annular channel 154 and port 134 and the passages S, U and W have constant fluid communication with annular channel 155 and port 135. If a remotely located motor actuator such as the actuator 5 in FIG. 1 is connected to ports 134 and 135, the metering unit 1B will function to supply fluid to one side of it through passages G, I and K and port 134 and exhaust fluid from the other side of it through port 135 and passages S, U and W, or vice versa, depending on the direction that commutator valve 98 is rotated relative to the casing 91.

In the operation of the metering unit 1B, steering wheel 107 is rotated in one direction or the other until it is stopped by pin 118 and thereafter steering wheel 107 and commutator valve 98 rotate together as a unit relative to casing section 91 with a commutating action taking place between the passages G to L and S to X of valve 98 and the passages 136 to 142 in the casing. Assuming that the steering wheel 107 is rotated in a clockwise direction, valve 98 would be moved to the left from its neutral position and valve 98 as viewed in FIG. 18 would be rotating in a counter-clockwise direction. The passages 157 therein would be connected to the inlet port 132 and fluid would flow to the commutator valve passages T, V and X. Commutator passages H, J and L would be in fluid communication with the outlet port 133 through the passages 156. At the instant when commutator valve 98 is in its position as shown in FIG. 18 and when star 96 is in its position as shown in FIG. 14, the flow conditions will be that fluid from the inlet port 132 will flow through commutator valve passages V and X and through casing passages 140 and 142 to gerotor chambers 143 and 145 which are expanding. Expanding chamber 144 at that instant is in fluid communication with port 135 through casing passage 141, commutator valve passage W and annular channel 155 and thus fluid may flow in through port 135 to the expanding chamber 144. On the right side of the line of eccentricity 158, chambers 146 to 148 are contracting and the fluid in chamber 147 will be discharged to the outlet port 133 through casing passage 137, valve passage H, valve passage 156 connected to passage H, and annular chamber 153. Chambers 146 and 148 which are also contracting at that instant will have the fluid therefrom exhausted under pressure to port 134 through casing passage 136 and 138, valve passages G and I and annular channel 154. Thus at that instant a metered amount of fluid from the gerotor is being delivered to the port 134 and a metered amount of fluid is being received by the gerotor through actuator port 135. Thus an actuator motor, such as actuator motor 5 of FIG. 1, connected to ports 134 and 135 would have both the fluid delivered thereto and fluid exhausted therefrom metered by the expanding and contracting chambers formed in the gerotor. The turning of the steering wheel 107 in the opposite or counterclockwise direction would produce similar fluid flow conditions except that the flow of fluid to and from the ports 134 and 135 would be reversed.

As long as continued rotation is imparted to commutator valve 98 by the steering wheel 107 in either direction so that fluid communication is maintained between the inlet port 132 and one set of passages HJL or TVX, commutator valve 98 will continue to rotate and metered amounts of fluid will be supplied to and exhausted from an actuator motor connected to ports 134 and 135. When the rotation of steering wheel 107 is stopped, the commutator valve 98 will continue its rotation for only a few additional degrees during which time the camming action between the valve 98 and the steering wheel 107 will move the valve axially until it again assumes a neutral position relative to inlet and outlet ports 132 and 133.

Other arrangements of the commutator passages G to L and S to X of the commutator valve 98 are also within the scope of the invention. In the metering unit 1B the arrangement is such that in operation each of the ports 132 to 135 have three of the valve commutating passages in fluid communication therewith. If steering wheel 107 is turned to the left so that commutator valve 98 moves axially to the right, the series of passages G, S, H, T, I, U, J, V, K, W, L, X would be connected respectively to the ports 134, 135, 132, 133, 134, 135, 132, 133, 134, 135, 132 and 133. Other arrangements could be provided for a gerotor having a 7 to 6 teeth ratio wherein either four or eight of the commutator passages G to X would be connectable to the inlet and outlet ports 132 and 133 during operation of the device instead of six as illustrated. If four of the twelve passages G to X are connectable to the pressure and exhaust ports 132 and 133, eight of the passages would be connected to the ports 134 and 135. Likewise, if eight of the twelve passages G to X are connectable to the inlet and outlet ports 132 and 133, only four of the passages would be available for connection to the ports 134 and 135.

FIGS. 23 to 33 show a metering unit 1C which illustrates a third embodiment of the invention. The metering unit 1C has a casing which comprises an annularly and cylindrically shaped section 160, an annular plate 161, a gerotor casing section 162 and an end cover plate 163. End plate 163, which serves as a side plate for the gerotor casing section 162, and casing sections 160 to 162 are attached together and held in axial alignment by a plurality of circumferentially spaced bolts 164. Gerotor casing section 162 (see FIG. 25) is generally cylindrical and annular and has a plurality of internal teeth. An externally toothed star member 165 having at least one fewer teeth than casing section 162, which may be referred to as ring member 162, has the teeth thereof in meshing engagement with the teeth of ring member 162.

Except for the difference that star 165 has a central bore 166 and the ratio between the ring member teeth and the star member teeth is 8 to 7 instead of 7 to 6 as in the first two embodiments of the invention, the ring and star members 162 and 165 and casing plates 161 and 163 may be identical to the corresponding parts in the first embodiment of the invention and thus will not be described in detail.

Casing section 160 has a bore 167 and slidably disposed and supported in bore 167 for axial movement is a cylindrically shaped valve 168 which has a concentrically disposed bore 169 at the right end thereof.

Valve 168 has cylindrical portions 170 and 171 of reduced diameters at opposite ends thereof and a shaft portion 172 of further reduced diameter at the left end thereof. Casing section 160 has counterbores 173 and 174 at opposite ends thereof. The middle portion of valve 168 between portions 170 and 171 thereof is equal in length to the distance counterbores 173 and 174 are spaced apart and when valve 168 is in its neutral position as shown in FIG. 23, the middle portion of valve 168 between portions 170 and 171 thereof is centered between counterbores 173 and 174. The lengths of counterbores 173 and 174 are sufficient to permit axial movement of the valve 163 in either axial direction relative to its neutral position.

Casing section 160 has an annular flange 175 at the left end thereof. A steering wheel 176 having a hub 177 with a bore 178 and a counterbore 179 is attached to casing section 160 so as to be both axially fixed and in relatively rotatable relation relative to casing section 160. Steering wheel 176 is so attached to casing section 160 by having casing flange 175 rotatably disposed in the hub counterbore 179 and by providing an articulated collar 180 which slidably engages casing flange 175 and is fixedly attached to the hub 177 with bolts 181.

A sleeve 182 having an annular flange 183 is disposed between hub 177 and valve shaft portion 172 and is fixedly attached to hub 177 with screws 184. Shaft portion 172 has a diametrically extending bore 185 and press fitted into bore 185 is a pin 186. Sleeve 182 has inclined camming slots 187 and 188 on diametrically opposite sides thereof each having approximately the same width as the pin 186. Upon turning the wheel 176 in either direction relative to casing section 160, valve 168 will be moved axially in a corresponding direction relative to its neutral position in response to the action of the camming slots 187 and 188 on pin 186.

Annular rings 189 and 190 are provided at opposite ends of valve 168 in the annular spaces formed between the casing counterbores 173 and 174 and the valve portions 170 and 171. Coil springs 191 and 192 are disposed in these annular spaces which biasingly engage the annular rings 189 and 190, the steering wheel hub 177 and the casing valve plate 161. Springs 191 and 192 function to bias valve 168 towards its neutral position and to cause the valve to move to and be maintained in its neutral position after the removal of a turning force applied to the steering wheel 176 has caused axial movement of the valve.

A shaft 195 is disposed in valve bore 169 and extends between and mechanically connects star 165 and valve 168 in driving relation. Star 165 has a bore 166 which is concentric relative to the teeth thereof. Shaft 195 has an enlarged head 196 at the star end thereof which is cylindrically shaped, has the same diameter as the star bore 166 and is eccentrically disposed relative to the axis of rotation 197 of valve 168. Valve 168 has a bore 198 extending diametrically across valve bore 169 and a pin 199 is press fitted in bore 198. Shaft 195 has a slot 200 having the same width as pin 199 and the pin is disposed in this slot to provide a driving connection between shaft 195 and valve 168. Axial movement of shaft 195 is prevented by the sliding engagement of the sides of head 196 thereof with casing plate 161 and cover plate 163. The length of shaft slot 200 is sufficient so as to permit axial movement of valve 168 as described above.

Shaft 195 functions to cause valve 168 to rotate in synchronism with the orbital movement of star 165. In operation a star member 165 having seven teeth will make one revolution about its own axis 201 for every seven times the star member orbits in the opposite direction about the axis 197 of the ring member 162. Thus, the right end of the shaft 168 has both orbital movement in common with the star member 165 while the left end of the shaft has rotational movement in common with valve 195.

Assuming for the purpose of illustration that no fluid is being supplied to the metering unit 1C, the mechanical operation of the metering unit would be such that the turning of steering wheel 176 in either direction would cause turning of hub 107 relative to casing section 160 and the camming slots 187 and 188 would engage pin 186 to cause valve 168 to move axially in one direction or the other against the small resistance of one of the springs 191 or 192 until the opposite ends of slots 187 and 188 engage pin 186 to prevent further relative movement between steering wheel 176 and valve 168. The continued rotation of steering wheel 176 would cause the steering wheel and valve 168 to rotate together as a unit and causes the turning of shaft 195 through pin 199. The turning of shaft 195 causes star 165 to orbit relative to ring axis 197 in the same direction as the rotation of shaft 195. When the turning force is removed from the steering wheel 176, one of the springs 191 or 192 will move valve 168 axially to its neutral position and steering wheel 176 would be rotated slightly in the opposite direction by reason of the reverse camming action imparted to the slots 187 and 188 by the axial movement of pin 186.

Fluid inlet and outlet ports 202 and 203 are provided in casing section 160 which extend therethrough and open into the bore 167. Two ports 204 and 205 are provided in casing section 160 each of which is alternately an inlet port and an outlet port. Ports 204 and 205 extend through casing section 160 and open into bore 167. Ports 202 to 205 correspond respectively to the ports 6 to 9 of the metering unit 1 of FIG. 1.

Valve 168 and casing sections 160 and 161 have fluid passages through which fluid may be conveyed from the inlet port 202 and a selected one of the ports 204 or 205 to the expanding chambers of the gerotor and through which fluid may be conveyed from the collapsing chambers of the gerotor to the outlet port 203 and the other of the ports 204 or 205.

Casing sections 160 and 161 have formed jointly therein a plurality of generally axially extending, circumferentially arranged and spaced passages 206 to 213 illustrated as being eight in number which is equal to the number of teeth of the ring member 162. The passages 206 to 213 extend from points between the ring member teeth in the chamber formed by the ring member 162 (see FIG. 25) through casing sections 161 and 160 and open radially into the bore 167 of casing section 160 where fluid communication is established between passages 206 to 213, which are stationary, and passages to be described in the valve 168. The passages in valve 168 which have fluid communication with stationary passages 206 to 213 may be noted in FIG. 29. These passages comprise a set of six circumferentially arranged passages A to F. Upon rotation of valve 168 each of the passages A to F registers successively in fluid communication with the passages 206 to 213 in casing section 160.

In this embodiment of the invention the passages A to F have the form of recesses with each of the recesses being elongated in an axial direction so that fluid communication is facilitated between passages A to F and passages 206 to 213 for all axial positions of the valve 168.

Figure 29:
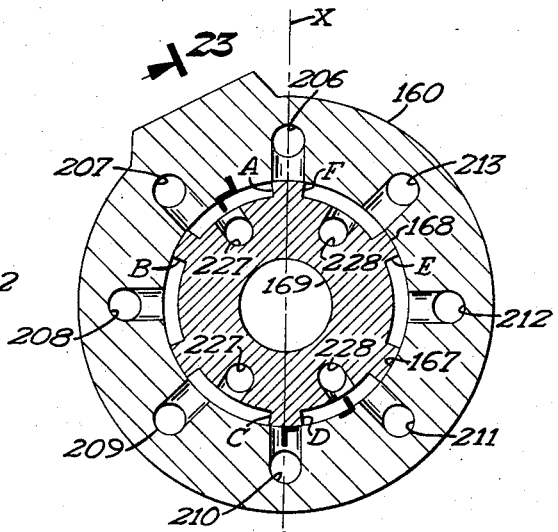
Figure 30:
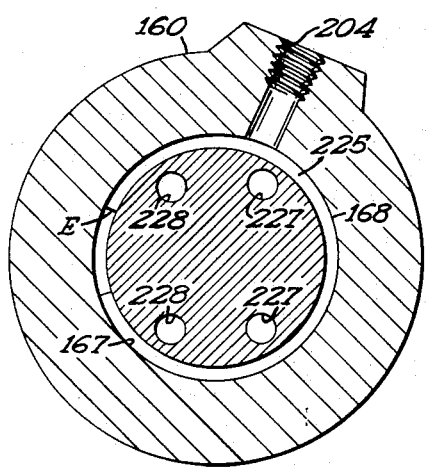
Figure 31:
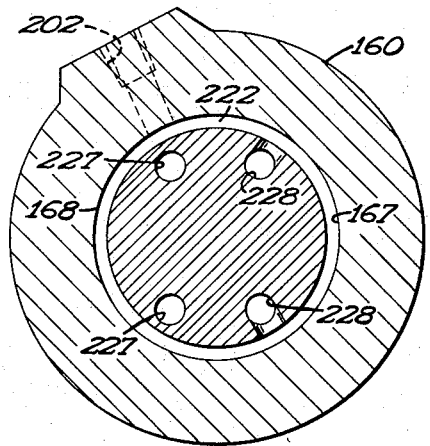
Figure 32:
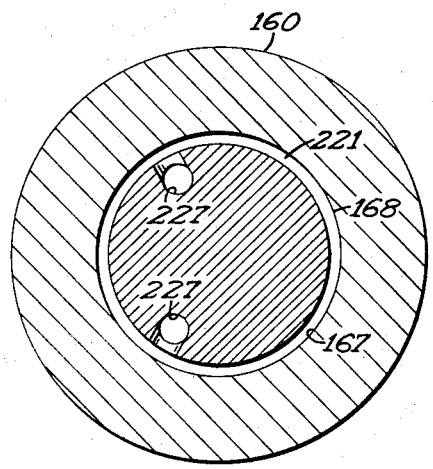
Figure 33:
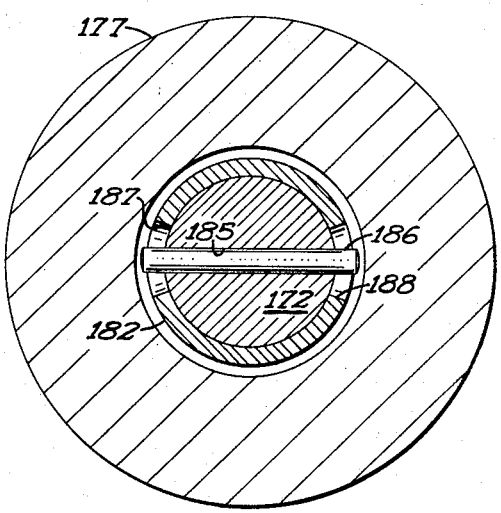
Figure 38:
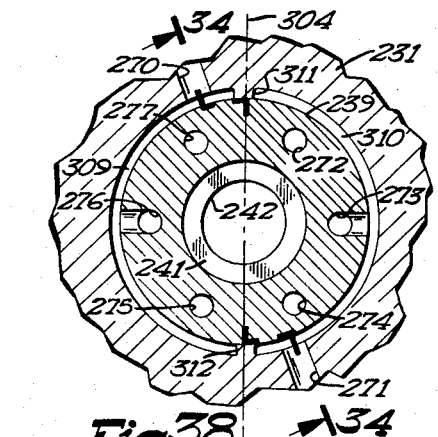
Figure 39:
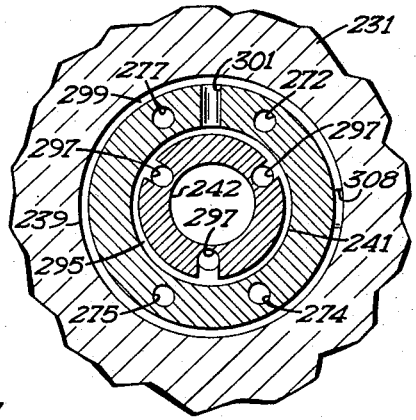
Figure 40:
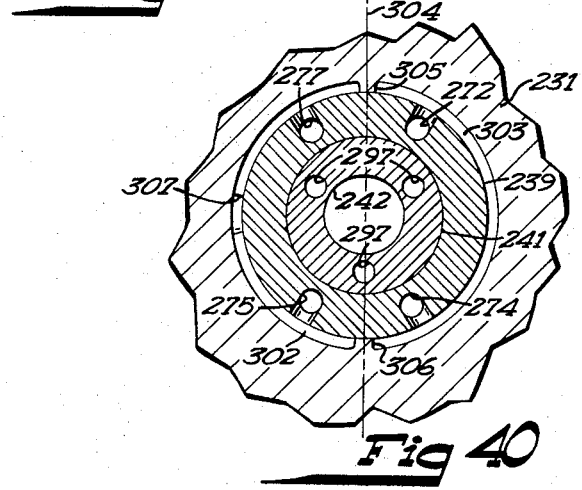
Figure 41:
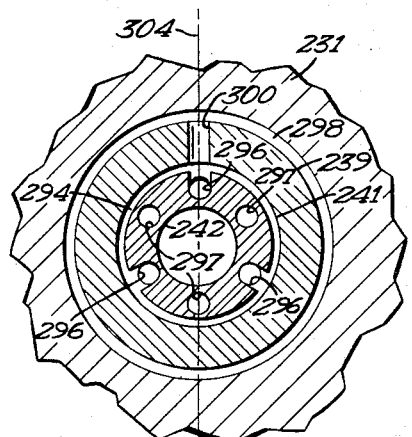

For convenience, the plane of FIG. 29 in which there is fluid communication between casing passages 206 to 213 and valve passages A to F will be referred to as the distributing plane. In the distributing plane the outer circumference of valve 168 is divided so that adjacent ones of the six passages A to F are separated a distance approximately equal to the circumferential width of each of the passages 206 to 213 at the places where passages 206 to 213 intersect casing bore 167.

In the operation of valve 160 as a distributor valve, fluid flows during rotation thereof through the passages A, B and C on one side of the line of eccentricity X to expanding chambers of the gerotor and from contracting chambers of the gerotor to the passages D, E and F on the other side of the line of eccentricity X, or vice versa depending on the direction of rotation of the valve 168. If the direction of rotation of valve 168 is clockwise as viewed in FIG. 29, fluid would be flowing from valve passages A, B and C through casing passages 207 to 209 to chambers 214 to 216 which would be expanding. The expansion of the chambers 214 to 216 causes star 165 to orbit in a clockwise direction and cause collapsing of the chambers 217 to 220 from which fluid would be flowing through casing passages 211 to 213 to the valve passages D, E and F. If the direction of valve 168 were reversed, the direction of flow would be the reverse of that described. For the position of star 165 shown in FIG. 25, chamber 217 is fully expanded and at that instant there is neither flow to or from chamber 217. At the next instant, however, the flow will be from the chamber 217 to the valve passage D if the rotation of valve 168 is clockwise or from the valve passage C to chamber 217 if the rotation of valve 168 is counterclockwise.

The above description of fluid flow is only for an instantaneous condition. As long as valve 168 rotates in one direction, however, fluid will always be supplied to expanding chambers from valve passages on the same side of the line of eccentricity X and fluid will always be exhausted from contracting chambers through valve passages on the other side of said line. Furthermore, the flow in the valve passages A to C will always be in the same direction, either to or from the gerotor, depending on the direction of rotation of valve 168. The same is true of the valve passages D to F except that the direction of fluid flow in passages D to F will always be the opposite of the direction of fluid flow in the passages A to C.

The relationship that distributing valve passages A to F have with ports 202 to 205 will now be described.

Distributor valve 168 has two annular channels 221 and 222 which straddle and have fluid communication with inlet port 202 when valve 168 is in its neutral position. Distributor valve 168 also has two annular channels 223 and 224 which straddle and have fluid communication with outlet port 203 when valve 168 is in its neutral position. When valve 168 is moved to the right from its neutral position the annular channels 221 and 223 are respectively in fluid communication with inlet and outlet ports 202 and 203 and when moved to the left from the neutral position the annular channels 222 and 224 are respectively in fluid communication with inlet and outlet ports 202 and 203.

Commutator valve 168 also has two annular channels 225 and 226 which are respectively in fluid communication with ports 204 and 205 for all axial positions of valve 168.

Valve 168 has four axially extending passages in the body thereof which are two passages 227 which connect annular channels 221 and 224 and two passages 228 which connect annular channels 222 and 223. In the distributing plane illustrated in FIG. 29 the passages 227 are respectively connected by short radial passages to valve passages A and C and the passages 228 are connected by short radial passages to valve passages D and F.

When valve 168 is in its neutral position, fluid under pressure at the inlet port 202 will flow into annular channels 221 and 222, through all of the passages 227 and 228 to the annular channels 223 and 224 and out the outlet port 203. This provides an open center condition when valve 168 is in its neutral position so that fluid under pressure in inlet port 202 is diverted directly to the outlet port 203. The turning of steering wheel 176 in either direction causes axial movement of valve 168. If valve 168 were caused to move to the right, annular channel 221 would be aligned with inlet port 202 and, as annular channel 224 would be blocked, fluid would be caused to flow through passages 227 to valve passages A and C. At the same time, annular channel 223 would be aligned with outlet port 203, and as annular channel 222 would be blocked, fluid would be caused to flow from passages D and F through passages 228 to outlet port 203. If valve 168 were moved to the left the described flow would be reversed with fluid from inlet port 202 flowing to passages D and F and fluid from passages A and C flowing to outlet port 203.

Referring now to ports 204 and 205, the annular land which separates annular channels 225 and 226 of distributor valve 168 has two bays or passages therein which are recessed relative to the channels 225 and 226 so as to have fluid communication with one or the other of the channels 225 or 226 and which constitute the passages B and E of the valve passages referred to above. The passage B has constant fluid communication with annular channel 226 and port 205 and the passage E has constant fluid communication with annular channel 225 and port 204. If a remotely located motor actuator such as the actuator 5 in FIG. 1 is connected to ports 204 and 205, the metering unit 1C will function to supply fluid to one side of it through passage B and port 205 and exhaust fluid from the other side of it through port 204 and passage E, or vice versa, depending on the direction that distributor valve 168 is rotated relative to the casing 160.

In the operation of the metering unit 1C, steering wheel 176 is rotated in one direction or the other until it is stopped by pin 186 and thereafter steering wheel 176 and distributor valve 168 rotate together as a unit relative to casing section 160 with a distributing action taking place between the passages A to F of valve 168 and the passages 206 to 213 in the casing. Assuming that the steering wheel 176 is rotated in a clockwise direction, valve 168 would be moved to the left from its neutral position and valve 168 as viewed in FIG. 29 would be rotating in a counterclockwise direction. The passages 228 therein would be connected to the inlet port 202 and fluid would flow to the distributor valve passages D and F. Valve passages A and C would be in fluid communication with the outlet port 203 through the passages 227. At the instant when distributor valve 168 is in its position as shown in FIG. 29 and when star 165 is in its position as shown in FIG. 25, the flow conditions will be that fluid from the inlet port 202 will flow through valve passages D and F and through casing passages 211 and 213 to gerotor chambers 218 and 220 which are expanding. Expanding chamber 219 at that instant is in fluid communication with port 204 through casing passage 212, valve passage E and annular channel 225 and thus fluid may flow in through port 204 to the expanding chamber 219. On the left side of the line of eccentricity X, chambers 214 to 216 are contracting and the fluid in chambers 214 and 216 will be discharged to the outlet port 203 through casing passages 207 and 209, valve passages A and C, valve passages 227, and annular channel 224. Chamber 215 which is also contracting at that instant will have the fluid therefrom exhausted under pressure to port 205 through casing passage 208, valve passage B and annular channel 226. Thus at that instant a metered amount of fluid from the gerotor is being delivered to the port 205 and a metered amount of fluid is being received by the gerotor through port 204. Thus an actuator motor, such as actuator motor 5 of FIG. 1, connected to ports 204 and 205 would have both the fluid delivered thereto and fluid exhausted therefrom metered by the expanding and contracting chambers formed in the gerotor. The turning of the steering wheel 176 in the opposite or counterclockwise direction would produce similar fluid flow conditions except that the flow of fluid to and from the ports 204 and 205 would be reversed.

As long as continued rotation is imparted to distributor valve 168 by the steering wheel 176 in either direction so that fluid communication is maintained between the inlet port 202 and one set of passages AC or DF, valve 168 will continue to rotate and metered amounts of fluid will be supplied to and exhausted from an actuator motor connected to ports 204 and 205. When the rotation of steering wheel 176 is stopped, the valve 168 will continue its rotation for only a few additional degrees during which time the camming action between the valve 168 and the steering wheel 107 will move the valve axially until it again assumes a neutral position relative to inlet and outlet ports 202 and 203.

Other arrangements of the valve passages A to F of the valve 168 are also within the scope of the invention. In the metering unit 1C the arrangement is such that in operation the inlet and outlet ports 202 and 203 each have two passages in fluid communication therewith. If steering wheel 176 is turned to the left so that valve 168 moves axially to the right, inlet port 202 would have the two valve passages A and C connected thereto and outlet port 203 would have the two valve passages D and F connected thereto. Other arrangements could be provided wherein only one of the passages A to F would be connected to the inlet port 202 and only one passage would be connected to the outlet port 202. In that case four of the passages A to F would be utilized for the actuator ports 204 and 205 instead of only the two passages B and E as illustrated in metering unit 1C.

FIGS. 34 to 45 show a metering unit 1D which illustrates a fourth embodiment of the invention. The metering unit 1D has a casing which comprises an annular flanged end member 230, an annularly and cylindrically shaped section 231, an annular plate 232, a cylindrically shaped rotor casing section 233 and an end cover plate 234.

Casing sections 230 and 231 are held together in axial alignment by a plurality of circumferentially spaced bolts 235. End plate 234, which serves as a side plate for the rotor casing section 233, and casing sections 231 to 233 are attached together and held in axial alignment by a plurality of circumferentially spaced bolts 236.

Casing sections 230 and 231 jointly form a bore 237 having an axis 238 and rotatably disposed and supported in bore 237 is a cylindrically and annularly shaped distributor valve 239 which has a bore 240. Rotatably disposed and supported in the bore 240 of valve 239 is a cylindrically shaped control valve 241 which has a bore 242 and a counterbore 243. Valves 239 and 241 are coaxial relative to axis 238.

With reference to FIGS. 34 and 37, the rotor casing section 233 has a bore 244 having an axis 244a which is eccentrically disposed relative to the axis 238. Valve 239 has a cylindrically shaped rotor portion 245 at the right end thereof which is concentric relative to and is of lesser diameter than the portion of the valve that is disposed in casing bore 237. Rotor portion 245 extends through and is in sealing engagement with the bore of casing section 232. Rotor portion 245 has a width equal to the combined widths of casing sections 232 and 233 and is disposed in the space formed by the bore 244 of casing section 233 and the bore of casing section 232 for rotation about axis 238. The rotor portion 245 has a plurality of circumferentially spaced, radially extending slots in which there are slidably disposed a plurality of rectangularly shaped vanes 246 each having the same width as the casing section 233. During rotational movement of rotor 245 the vanes 246 sealingly engage the bore 244 of casing section 233 to form expanding and contracting chambers which for the position of the rotor 245 shown in FIG. 37 are the chambers 247 to 252. In the operation of the sliding vane unit, assuming rotor 245 is rotating clockwise as viewed in FIG. 37, fluid under pressure would be directed to the expanding chambers 247 to 249 and exhausted from the contracting chambers 250 to 252, or vice versa if the direction of the rotor 245 were counterclockwise. The valving arrangement which facilitates the feeding and exhausting of the chambers 247 to 252 will be described further on herein.

Control valve 241 has an annularly shaped collar 253 which rotatably engages a central bore 254 of casing section 230. Bore 243 of control valve 241 is provided with splines 255. A shaft 256 having a splined end portion 257 which engages the splines 255 is provided for rotating the control valve 241. If the metering unit 1D is to be used in a vehicle steering system, a steering wheel (not shown) would be attached to the shaft 256.

Control valve 241 is shown in its neutral position relative to distributing valve 239 but in operation it has a limited predetermined rotary movement relative to valve 239. This relative rotary movement is facilitated by a pin and slot construction. A pin 258 (see FIGS. 34 and 45) is fixedly attached to distributor valve 239 by being press fitted in holes 259 in valve 239 on opposite sides thereof and extends diametrically across valve bore 240. Circumferentially extending and diametrically opposed slots 260 and 261 are provided on opposite sides of control valve 241 to provide for the limited relative rotary movement between valves 239 and 241. When control valve 241 is rotated in either direction from its neutral position, the pin 258 becomes engaged by opposite ends of the opposed slots 260 and 261 after which the continued rotary movement of the control valve 241 will cause similar rotary movement to be imparted to the valve 239.

For the purpose of yieldingly urging the control valve 241 to assume its neutral position relative to valve 239 wherein slots 260 and 261 will be centered relative to pin 258, there is provided a plurality of leaf springs 262 (see FIG. 44) which extends radially through a pair of diametrically opposed holes 263 in distributor valve 239 and a pair of diametrically opposed holes 264 in control valve 241.

Assuming for the purpose of illustration that no fluid is being supplied to the metering unit 1D, the mechanical operation of the metering unit would be such that the turning of shaft 256 in either direction would cause turning of control valve 241 relative to distributor valve 239 against the small resistance of spring 262 until the opposite ends of valve slots 260 and 261 engage pin 258. The continued rotation of shaft 256 would cause valves 239 and 241 to rotate together as a unit. The turning of valve 239 causes sliding vane rotor 244 to rotate relative to the rotor casing 233. When the turning force is removed from shaft 256, control valve 241 will be rotated slightly in the opposite direction by spring 262 so as to again assume its neutral position relative to distributor valve 239.

Fluid inlet and outlet ports 268 and 269 are provided in casing section 231 which extends therethrough and open into the bore 237. Two ports 270 and 271 are provided in casing section 231 each of which is alternately an inlet port and an outlet port. Ports 270 and 271 extend through casing section 231 and open into bore 237. Ports 268 to 271 correspond respectively to the ports 6 to 9 of the metering unit 1 of FIG. 1.

Distributor valve 239, control valve 241 and casing section 231 are provided with fluid passages through which fluid may be conveyed from the inlet port 268 and a selected one of the ports 270 or 271 to the expanding chambers of the sliding vane unit and through which fluid may be conveyed from the collapsing chambers of the sliding vane unit to the outlet port 269 and the other of the ports 270 or 271.

Distributor valve rotor portion 245 has a plurality of holes 272 to 277 which are disposed respectively between the vanes 246 and extend radially inwardly from the circumference thereof. Distributor valve 239 has formed therein a plurality of generally axially extending, circumferentially arranged and spaced passages 272 to 277 (see FIG. 38) which have fluid communication respectively with the radially extending holes 272 to 277 in the rotor portion 245.

As will appear in detail further on, control valve 241 is operable to control the supplying and exhausting of fluid to and from the valve passages 272, 274, 275 and 277 relative to the inlet and outlet ports 268 and 269 to selectively cause the sliding vane unit to rotate in one direction or the other and thereby selectively cause fluid to flow out of one of the ports 270 or 271 and into the other of said ports through valve passages 273 and 276.

The bore 237 of casing section 231 is provided with annular channels 278 and 279 which are connected respectively to the inlet and outlet ports 268 and 269. Valve 239 has six circumferentially spaced, radially extending holes 280 to 285 (see FIGS. 42 and 43) with holes 280, 282 and 284 being in axial alignment with inlet port 268 and holes 281, 283 and 285 being in axial alignment with outlet port 269. Control valve 241 has six circumferentially spaced slots 286 to 291 which extend axially between the planes 43 and 42 of the inlet and outlet ports 268 and 269.

Valves 239 and 241 are shown in their neutral positions relative to each other and, using this neutral position as a reference point, valve 239 has two holes 292 and 293 respectively in the planes of inlet and outlet ports 268 and 269 and radially aligned with the slot 286 of valve 241. When valves 239 and 241 are in the neutral position shown, pressurized fluid at the inlet port 268 will be bypassed to the outlet port 269 by flowing through annular channel 278, valve hole 292, valve slot 286, valve hole 293 and annular channel 279.

Control valve 241 has annular channels 294 and 295. The set of valve slots 286, 288 and 290 is connected to annular channel 294 with three axially extending passages 296 and the set of valve slots 287, 289 and 291 is connected to annular channel 295 with three axially extending passages 297.

Casing section 231 has annular channels 298 and 299 in the bore 237 thereof in the planes 41 and 39 which are axially aligned respectively with the annular channels 294 and 295 of valve 241. Valve 239 has radially extending holes 300 and 301 in the planes 41 and 39 with hole 300 connecting annular channels 294 and 298 and with hole 301 connecting annular channels 295 and 299.

In the operation of metering unit 1D, control valve 241 is rotated in either direction relative to the casing and distributor valve 239 until the pin 258 contacts the ends of slots 260 and 261 in valve 239 and thereafter valves 239 and 241 rotate as a unit relative to the casing. When control valve 241 is rotated in a clockwise direction as viewed in FIGS. 42 and 43, until the pin 258 contacts the ends of slots 260 and 261, valve slots 287, 289 and 291 will have fluid communication with inlet port 268 by reason of their registering with valve holes 282, 284 and 280 and valve slots 286, 288 and 290 will have fluid communication with outlet port 269 by reason of their registering with valve holes 281, 283 and 285. Thus when the valve 241 is turned in a clockwise direction, as viewed in FIGS. 42 and 43, inlet port 268 is caused to have fluid communication with annular channel 299 through passages 278, 280–282–284, 287–289–291, 297, 295 and 301 while outlet port 269 is caused to have fluid communication with annular channel 298 through passages 279, 281–283–285, 286–288–290, 296, 294 and 300. The turning of valve 241 in the other direction would give the opposite results by connecting inlet port 268 to annular channel 298 and outlet port 269 to annular channel 299.

Casing section 231 has an articulated annular channel in the plane 40 between annular channels 298 and 299 which comprises two arc shaped channels 302 and 303 on opposite sides of the vertical centerline 304 of the device. Channels 302 and 303 are separated circumferentially by partitions which are casing portions 305 and 306.

Channel 302 (see FIG. 40) has constant fluid communication with annular channel 298 through a casing passage 307 while channel 303 (see FIGS. 39 and 40) has constant fluid communication with annular channel 299 through a casing passage 308. Thus channels 302 and 303 are selectively connectible to inlet and outlet ports 268 and 269 by the turning of the valve 241 in one direction or the other.

Fluid is conveyed between the channels 307 and 308 and the sliding vane chambers 247, 249, 250 and 252 by passages 272, 274, 275 and 277 of valve 239. Passages 272, 274, 275 and 277 have short radially extending portions in plane 40 which open into the bore 237 of casing section 231 and have fluid communication with channels 302 and 303. Each of radially extending passage portions in plane 40 has a diameter which is substantially equal to the width of each of the casing portions 305 and 306 which separate channels 302 and 303.

Figure 42:
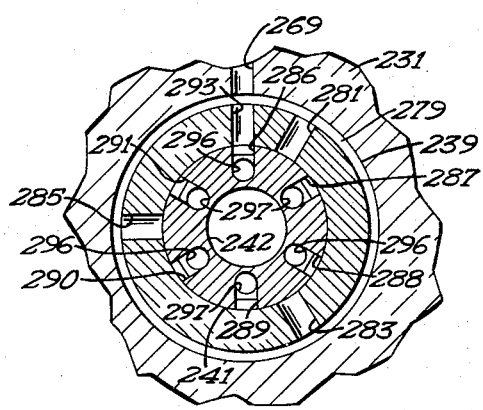
Figure 43:
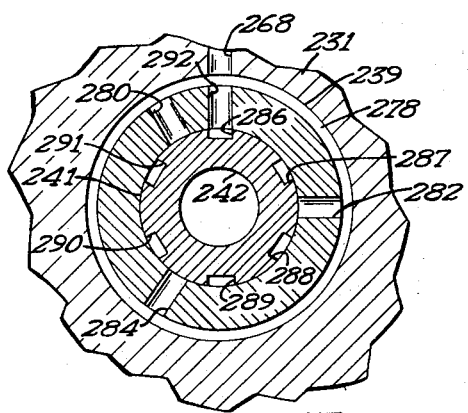
Figure 44:
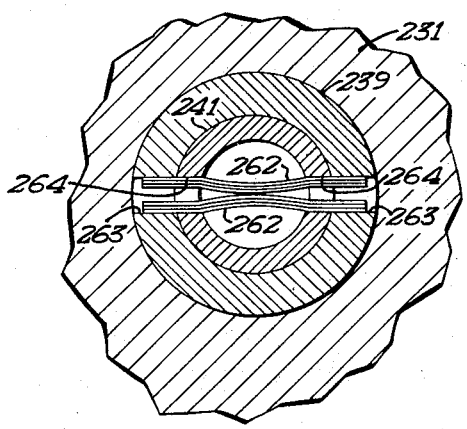
Figure 45:
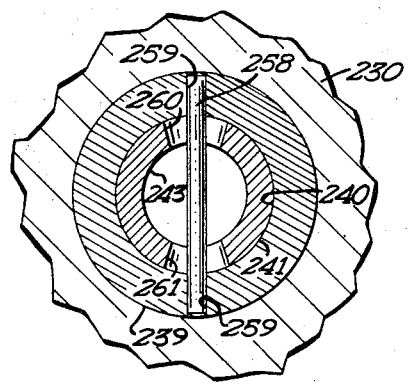

With the construction described thus far the turning of the control valve in a clockwise direction as viewed in FIGS. 42 and 43 will cause fluid to flow from the inlet port 268 through the valve slots 287, 289, and 291, through valve passages 297 to the annular channel 295, through hole 301 in valve 239 to the annular channel 299, through casing passage 308 to channel 303, through the passages 272 and 274 of valve 241 to sliding vane chamber 247 and 249 which are expanding. Fluid from the sliding vane chambers 250 and 252 which are contracting will flow to outlet port 269 through passages 275 and 277 in valve 239 to channel 302 through casing passage 307 to channel 298 through hole 300 in valve 239 to annular channel 294, through passages 296 in valve 241 to slots 286, 288 and 290 in valve 239, through holes 281, 283 and 285 in valve 239 to annular channel 279, and out outlet port 269. If the direction of rotation of valves 239 and 241 were reversed, the direction of flow would be the reverse of that described.

Referring now to ports 270 and 271, casing section 231 has an articulated annular channel in the plane 38 which comprises two arc shaped channels 309 and 310 on opposite sides of the vertical centerline 304 of the device which are respectively connected to and have fluid communication with ports 270 and 271. Channels 309 and 310 are separated circumferentially by partitions which are casing portions 311 and 312. Fluid is conveyed from the channels 309 and 310 into sliding vane chambers 251 and 248 respectively by the respective passages 276 and 273. Passages 273 and 276 have short radially extending portions in the plane 38 which open into the bore 237 of casing section 231 and have fluid communication with channels 310 and 309. Each of the radially extending portions of passages 273 and 276 in plane 38 has a diameter which is substantially equal to the width of each of the casing portions 311 and 312 which separate channels 309 and 310.

If a remotely located motor actuator such as the actuator 5 in FIG. 1 is connected to ports 270 and 271, the metering unit 1D will function to supply fluid to one side of it through port 270 and exhaust fluid from the other side of it through port 271, or vice versa, depending on the direction that control valve 241 is rotated from its neutral position. If valve 239 and rotor 245 are being rotated in a clockwise direction as viewed in FIG. 37, the chamber 248 which is connected to port 271 through passage 273 and channel 310 would be expanding and fluid would flow from port 271 to chamber 248. At the same time the chamber 251 which is connected to port 270 through passage 276 and channel 309 would be contracting and fluid would flow from chamber 251 to port 270. When chambers 248 and 251 advance to the point where they are symmetrical with respect to the centerline 304, chamber 248 will be fully expanded and chamber 251 will be fully contracted. At that instant (1) passage 273 connected to chamber 248 will have just lost contact with channel 310 and will in the next instant begin contracting and establishing communication with channel 309 so that fluid will then flow from chamber 248 out port 270 and (2) passage 276 connected to chamber 251 will have just lost contact with channel 309 and will in the next instant begin expanding and establishing communication with channel 310 so that fluid will then flow from port 271 to chamber 251. Thus at all times a metered amount of fluid from the sliding valve unit is being delivered to the actuator port 270 and a metered amount of fluid is being received by the sliding vane unit through actuator port 211. Thus an actuator motor, such as actuator motor 5 of FIG. 1, connected to ports 270 and 271 would have both the fluid delivered thereto and fluid exhausted therefrom metered by the expanding and contracting chambers 248 and 251 formed in the sliding vane unit. The turning of the control valve 241 in the opposite direction would produce similar fluid flow conditions except that the flow of fluid to and from the ports 270 and 271 would be reversed.

As long as continued rotation is imparted to control valve 241 by shaft 256 in either direction so that fluid communication is maintained between the inlet port 268 and one set of slots 286–288–290 or 287–289–291, valve 239 will continue to rotate and metered amounts of fluid will be supplied to and exhausted from an actuator motor connected to ports 270 and 271. When the rotation of shaft 256 is stopped by the operator, the valve 239 will continue its rotation for a few additional degrees until it again assumes a neutral position relative to control valve 241.

It will be understood that the sliding vane unit is only one example of an expansible chamber device to which the invention has been applied, in addition to gerotor gear sets, and that other expansible chamber types of devices are included within the scope of the invention such as barrel type pump and motor devices.

With regard to the invention generally, it is desired to be mentioned that while specific control means are disclosed for adapting the invention to steering types of units, the scope of the invention is not intended to be limited to the controls illustrated. The controls disclosed are of the reversing type of apparatus which do not require the reversing function or which do not have to be under the manual control of an operator.

While four embodiments of the invention are described here, it will be understood that other modifications are possible, and that such modifications, including a reversal of parts, may be made without departure from the spirit and scope of the invention as defined in the claims.

What I claim is:

1. Fluid pressure apparatus comprising, a casing, a pair of fluid inlet and outlet ports in said casing, a second pair of ports in said casing having fluid communication with the exterior of said casing, chamber forming means for forming expanding and contracting chambers, valve means operatively associated with said chamber forming means for sequentially connecting said fluid inlet port and one of said second pair of ports to separate ones of said expanding chambers and for simultaneously and sequentially connecting said outlet port and the other one of said second pair of ports to separate ones of said contracting chambers.

2. Fluid pressure apparatus according to claim 1 including valve control means for selectively connecting either one of second pair of said ports to said expanding chambers and the other one of said second pair of ports to said contracting chambers.

3. Fluid pressure apparatus according to claim 1 including a fluid pressure operated motor having a third pair of inlet and outlet ports, means for respectively connecting said third pair of ports to said second pair of ports.

4. Fluid pressure apparatus according to claim 1 wherein said chamber forming means comprises an internally toothed ring member defining the outer wall of a chamber, a cooperating externally toothed star member having fewer teeth than said ring member disposed eccentrically in said chamber, one of said members having orbital movement about the axis of the other of said members and one of said members having rotational movement about its own axis, the teeth of said members intermeshing in sealing engagement to form expanding chambers on one side of the line of eccentricity between said members and contracting chambers on the other side of said line during relative movement between said members.

5. Fluid pressure apparatus according to claim 4 wherein drive means operatively connect said valve to one of said members for rotation of said valve in synchronism with one of said movements of one of said members.

6. Fluid pressure apparatus according to claim 5 wherein said drive means connects said valve to one of said members having rotational movement for rotation of said valve in synchronism with said rotational movement.

7. Fluid pressure apparatus according to claim 5 wherein said drive means connects said valve to one of said members having orbital movement for rotation of said valve in synchronism with said orbital movement.

8. Fluid pressure apparatus according to claim 6 wherein said casing has a plurality of circumferentially arranged passages having fluid communication with said expanding and contracting chambers, said valve having first and second series of circumferentially and alternately arranged passages with the number of passages in each series differing by one from the number of said plurality of passages, said valve being a commutating valve whereby fluid communication between said two series of passages and said plurality of passages upon rotation of said valve causes fluid in one series of passages to flow to said expanding chambers and fluid in said contracting chambers to flow to said other series of passages, said first series of passages having during rotation of said valve at least one passage thereof in fluid communication with said inlet port and at least one passage thereof in fluid communication with one of said second pair of ports, said second series of passages having during rotation of said valve at least one passage thereof in fluid communication with said outlet port and at least one passage thereof in fluid communication with the other of said second pair of ports.

9. Fluid pressure apparatus according to claim 8 wherein said first series of passages has alternate passages in respective fluid communication with said inlet port and one of said ports of said second pair of ports, and said second series of passages has alternate passages in respective fluid communication with said outlet port and the other of said ports of said second pair of ports.

10. Fluid pressure apparatus according to claim 9 including valve control means for reversing the fluid communication connections between said first and second series of passages and said fluid inlet and outlet ports.

11. Fluid pressure apparatus according to claim 10 wherein said valve control means includes resilient means for maintaining said valve in an inoperative position.

12. Fluid pressure apparatus according to claim 7 wherein said casing has a plurality of circumferentially arranged passages having fluid communication with said expanding and contracting chambers, said valve having first and second groups of passages on opposite sides of said line of eccentricity whereupon fluid communication between said two groups of passages and said plurality of passages upon rotation of said valve causes fluid in one group of passages to flow to said expanding chambers and fluid in said contracting chambers to flow to said other group of passages, said first group of passages having during rotation of said valve at lesat one passage thereof in fluid communication with said inlet port and at least one passage thereof in fluid communication with one of said second pair of ports, said second group of passages having during rotation of said valve at least one passage thereof in fluid communication with said outlet port and at least one passage thereof in fluid communication with the other of said second pair of ports.

13. Fluid pressure apparatus according to claim 12 wherein said first group of passages has two passages adjacent said line of eccentricity in fluid communication with said inlet port and one passage between said two passages in fluid communication with one of said ports of said second pair of ports, and said second group of passages has two passages adjacent said line of eccentricity in fluid communication with said outlet port and one passage between said last referred to two passages in fluid communication with the other of said ports of said second pair of ports.

14. Fluid pressure apparatus according to claim 13 including valve control means for reversing the fluid communication connections between said first and second groups of passages and said fluid inlet and outlet ports.

15. Fluid pressure apparatus according to claim 14 wherein said valve control means includes resilient means for maintaining said valve in an inoperative position.

16. Fluid pressure apparatus according to claim 1 wherein said chamber forming means comprises a housing bore in said casing, a rotary cylindrical piston mounted eccentrically within said bore and dimensioned to provide a lunate chamber between its periphery and the inner periphery of said bore, a plurality of spaced radial slots in said piston and blades mounted therein for reciprocal movement with their outer ends in constant wiping contact with said inner periphery of said bore, said piston being rotatable to form expanding chambers on one side thereof between said piston and said bore and contracting chambers on the other side thereof between said piston and said bore during relative movement between said piston and said bore.

17. Fluid pressure apparatus according to claim 16 wherein means operatively connect said valve to said piston for rotation of said valve in synchronism with said piston.

18. Fluid pressure apparatus according to claim 17 wherein said valve has a series of circumferentially arranged passages having respective fluid communication with said chambers and upon rotation of said valve fluid in said valve passages on one side of said valve flow to said expanding chambers and fluid in said contracting chambers flow to said valve passages on the other side of said valve, there being at any instant on one side of said valve at least one passage in fluid communication with said inlet port and at least one passage in fluid communication with one of said second pair of ports and on the other side of said valve at least one passage in fluid communication wtih said outlet port and at least one passage in fluid communication with the other of said second pair of ports.

19. Fluid pressure apparatus according to claim 18 wherein two of said valve passages on one side of said valve have fluid communication with said inlet port and one passage between said two passages is in fluid communication with one of said ports of said pair of ports, and wherein two of said passages on the other side of said valve have fluid communication with said outlet port and one passage between said last referred to two passages is in fluid communication with the other of said ports of said second pair of ports.

20. Fluid pressure apparatus according to claim 19 including valve control means for reversing the connections of the valve passages having fluid communication with said fluid inlet and outlet ports.

References Cited

UNITED STATES PATENTS

| Re. 25,126 | 2/1962 | Charlson | 91—56 |
| Re. 25,291 | 12/1962 | Charlson | 91—56 |
| 861,626 | 7/1907 | Young | 103—117 |
| 2,569,717 | 10/1951 | Holl | 103—117 |
| 3,087,436 | 4/1963 | Dettlof et al. | 103—126 |
| 3,270,681 | 9/1966 | Charlson | 103—130 |
| 3,270,682 | 9/1966 | Charlson | 103—130 |
| 3,286,645 | 11/1966 | Albers | 103—130 |
| 3,288,078 | 11/1966 | Monroe et al. | 103—130 |
| 3,289,542 | 12/1966 | Fikse | 91—56 |
| 3,309,999 | 3/1967 | Patterson et al. | 103—130 |

DONLEY J. STOCKING, *Primary Examiner.*

WILBUR J. GOODLIN, *Examiner.*